United States Patent
Feng et al.

(10) Patent No.: US 9,805,237 B2
(45) Date of Patent: Oct. 31, 2017

(54) CANCELLING NOISE CAUSED BY THE FLICKER OF AMBIENT LIGHTS

(71) Applicant: Hand Held Products, Inc., Fort Mill, SC (US)

(72) Inventors: Chen Feng, Snohomish, WA (US); Jie Ren, Suzhou (CN); Jun Lu, Suzhou (CN); Haiming Qu, Suzhou (CN); Qing Zhang, Suzhou (CN)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

(21) Appl. No.: 15/225,190

(22) Filed: Aug. 1, 2016

(65) Prior Publication Data

US 2017/0083730 A1     Mar. 23, 2017

(30) Foreign Application Priority Data

Sep. 18, 2015    (CN) .................... 2015 2 0726980 U

(51) Int. Cl.
    *G06K 7/10*          (2006.01)
    *G06K 19/06*        (2006.01)

(52) U.S. Cl.
    CPC ..... *G06K 7/10851* (2013.01); *G06K 7/10574* (2013.01); *G06K 19/06028* (2013.01)

(58) Field of Classification Search
    CPC .. G06K 7/10; G06K 7/10851; G06K 7/10881; G06K 7/10574; G06K 19/06028

(Continued)

(56) References Cited

U.S. PATENT DOCUMENTS 4,303,855 A * 12/1981 Bapst ................. G06K 7/10594
                                                       250/226
4,694,182 A * 9/1987 Howard ............. G06K 7/10851
                                                      235/462.06

(Continued)

FOREIGN PATENT DOCUMENTS

WO       2013163789 A1    11/2013
WO       2013173985 A1    11/2013

(Continued)

OTHER PUBLICATIONS

U.S. Appl. No. 14/715,916 for Evaluating Image Values filed May 19, 2015 (Ackley); 60 pages.

(Continued)

*Primary Examiner* — Laura Gudorf
(74) *Attorney, Agent, or Firm* — Additon, Higgins & Pendleton, P.A.

(57) ABSTRACT

Systems and methods for cancelling noise caused by the flicker of ambient lights are provided. Such noise cancelling systems and methods may be incorporated in a laser-based barcode scanning device. In one example, a barcode scanning device includes a light source, a first sensor, a second sensor, and a noise cancelling circuit. The light source is configured to emit a beam of light. The first sensor is configured to detect a first optical signal indicative of light reflecting off of a barcode. The reflected light may originate from the light source and from at least one ambient light source in the vicinity of the barcode scanning device. The second sensor is configured to detect a second optical signal indicative of light originating from the at least one ambient light source. The noise cancelling circuit is configured to obtain a noise-cancelled scanning signal from the first and second optical signals.

20 Claims, 7 Drawing Sheets

(58) Field of Classification Search
USPC .............................................. 235/435, 462.26
See application file for complete search history.

(56) References Cited

U.S. PATENT DOCUMENTS

| | | | |
|---|---|---|---|
| 4,818,856 A * | 4/1989 | Matsushima | G06K 7/10881 235/454 |
| 5,852,286 A * | 12/1998 | Coleman | G06K 7/10584 235/455 |
| 6,654,467 B1 * | 11/2003 | York | G10K 11/178 381/71.14 |
| 6,832,725 B2 | 12/2004 | Gardiner et al. | |
| 7,128,266 B2 | 10/2006 | Zhu et al. | |
| 7,159,783 B2 | 1/2007 | Walczyk et al. | |
| 7,413,127 B2 | 8/2008 | Ehrhart et al. | |
| 7,726,575 B2 | 6/2010 | Wang et al. | |
| 8,294,969 B2 | 10/2012 | Plesko | |
| 8,317,105 B2 | 11/2012 | Kotlarsky et al. | |
| 8,322,622 B2 | 12/2012 | Liu | |
| 8,366,005 B2 | 2/2013 | Kotlarsky et al. | |
| 8,371,507 B2 | 2/2013 | Haggerty et al. | |
| 8,376,233 B2 | 2/2013 | Van Horn et al. | |
| 8,381,979 B2 | 2/2013 | Franz | |
| 8,390,909 B2 | 3/2013 | Plesko | |
| 8,408,464 B2 | 4/2013 | Zhu et al. | |
| 8,408,468 B2 | 4/2013 | Horn et al. | |
| 8,408,469 B2 | 4/2013 | Good | |
| 8,424,768 B2 | 4/2013 | Rueblinger et al. | |
| 8,448,863 B2 | 5/2013 | Xian et al. | |
| 8,457,013 B2 | 6/2013 | Essinger et al. | |
| 8,459,557 B2 | 6/2013 | Havens et al. | |
| 8,469,272 B2 | 6/2013 | Kearney | |
| 8,474,712 B2 | 7/2013 | Kearney et al. | |
| 8,479,992 B2 | 7/2013 | Kotlarsky et al. | |
| 8,490,877 B2 | 7/2013 | Kearney | |
| 8,517,271 B2 | 8/2013 | Kotlarsky et al. | |
| 8,523,076 B2 | 9/2013 | Good | |
| 8,528,818 B2 | 9/2013 | Ehrhart et al. | |
| 8,544,737 B2 | 10/2013 | Gomez et al. | |
| 8,548,420 B2 | 10/2013 | Grunow et al. | |
| 8,550,335 B2 | 10/2013 | Samek et al. | |
| 8,550,354 B2 | 10/2013 | Gannon et al. | |
| 8,550,357 B2 | 10/2013 | Kearney | |
| 8,556,174 B2 | 10/2013 | Kosecki et al. | |
| 8,556,176 B2 | 10/2013 | Van Horn et al. | |
| 8,556,177 B2 | 10/2013 | Hussey et al. | |
| 8,559,767 B2 | 10/2013 | Barber et al. | |
| 8,561,895 B2 | 10/2013 | Gomez et al. | |
| 8,561,903 B2 | 10/2013 | Sauerwein | |
| 8,561,905 B2 | 10/2013 | Edmonds et al. | |
| 8,565,107 B2 | 10/2013 | Pease et al. | |
| 8,571,307 B2 | 10/2013 | Li et al. | |
| 8,579,200 B2 | 11/2013 | Samek et al. | |
| 8,583,924 B2 | 11/2013 | Caballero et al. | |
| 8,584,945 B2 | 11/2013 | Wang et al. | |
| 8,587,595 B2 | 11/2013 | Wang | |
| 8,587,697 B2 | 11/2013 | Hussey et al. | |
| 8,588,869 B2 | 11/2013 | Sauerwein et al. | |
| 8,590,789 B2 | 11/2013 | Nahill et al. | |
| 8,596,539 B2 | 12/2013 | Havens et al. | |
| 8,596,542 B2 | 12/2013 | Havens et al. | |
| 8,596,543 B2 | 12/2013 | Havens et al. | |
| 8,599,271 B2 | 12/2013 | Havens et al. | |
| 8,599,957 B2 | 12/2013 | Peake et al. | |
| 8,600,158 B2 | 12/2013 | Li et al. | |
| 8,600,167 B2 | 12/2013 | Showering | |
| 8,602,309 B2 | 12/2013 | Longacre et al. | |
| 8,608,053 B2 | 12/2013 | Meier et al. | |
| 8,608,071 B2 | 12/2013 | Liu et al. | |
| 8,611,309 B2 | 12/2013 | Wang et al. | |
| 8,615,487 B2 | 12/2013 | Gomez et al. | |
| 8,621,123 B2 | 12/2013 | Caballero | |
| 8,622,303 B2 | 1/2014 | Meier et al. | |
| 8,628,013 B2 | 1/2014 | Ding | |
| 8,628,015 B2 | 1/2014 | Wang et al. | |
| 8,628,016 B2 | 1/2014 | Winegar | |
| 8,629,926 B2 | 1/2014 | Wang | |
| 8,630,491 B2 | 1/2014 | Longacre et al. | |
| 8,635,309 B2 | 1/2014 | Berthiaume et al. | |
| 8,636,200 B2 | 1/2014 | Kearney | |
| 8,636,212 B2 | 1/2014 | Nahill et al. | |
| 8,636,215 B2 | 1/2014 | Ding et al. | |
| 8,636,224 B2 | 1/2014 | Wang | |
| 8,638,806 B2 | 1/2014 | Wang et al. | |
| 8,640,958 B2 | 2/2014 | Lu et al. | |
| 8,640,960 B2 | 2/2014 | Wang et al. | |
| 8,643,717 B2 | 2/2014 | Li et al. | |
| 8,646,692 B2 | 2/2014 | Meier et al. | |
| 8,646,694 B2 | 2/2014 | Wang et al. | |
| 8,657,200 B2 | 2/2014 | Ren et al. | |
| 8,659,397 B2 | 2/2014 | Vargo et al. | |
| 8,668,149 B2 | 3/2014 | Good | |
| 8,678,285 B2 | 3/2014 | Kearney | |
| 8,678,286 B2 | 3/2014 | Smith et al. | |
| 8,682,077 B1 | 3/2014 | Longacre | |
| D702,237 S | 4/2014 | Oberpriller et al. | |
| 8,687,282 B2 | 4/2014 | Feng et al. | |
| 8,692,927 B2 | 4/2014 | Pease et al. | |
| 8,695,880 B2 | 4/2014 | Bremer et al. | |
| 8,698,949 B2 | 4/2014 | Grunow et al. | |
| 8,702,000 B2 | 4/2014 | Barber et al. | |
| 8,717,494 B2 | 5/2014 | Gannon | |
| 8,720,783 B2 | 5/2014 | Biss et al. | |
| 8,723,804 B2 | 5/2014 | Fletcher et al. | |
| 8,723,904 B2 | 5/2014 | Marty et al. | |
| 8,727,223 B2 | 5/2014 | Wang | |
| 8,740,082 B2 | 6/2014 | Wilz | |
| 8,740,085 B2 | 6/2014 | Furlong et al. | |
| 8,746,563 B2 | 6/2014 | Hennick et al. | |
| 8,750,445 B2 | 6/2014 | Peake et al. | |
| 8,752,766 B2 | 6/2014 | Xian et al. | |
| 8,756,059 B2 | 6/2014 | Braho et al. | |
| 8,757,495 B2 | 6/2014 | Qu et al. | |
| 8,760,563 B2 | 6/2014 | Koziol et al. | |
| 8,763,909 B2 | 7/2014 | Reed et al. | |
| 8,777,108 B2 | 7/2014 | Coyle | |
| 8,777,109 B2 | 7/2014 | Oberpriller et al. | |
| 8,779,898 B2 | 7/2014 | Havens et al. | |
| 8,781,520 B2 | 7/2014 | Payne et al. | |
| 8,783,573 B2 | 7/2014 | Havens et al. | |
| 8,789,757 B2 | 7/2014 | Barten | |
| 8,789,758 B2 | 7/2014 | Hawley et al. | |
| 8,789,759 B2 | 7/2014 | Xian et al. | |
| 8,794,520 B2 | 8/2014 | Wang et al. | |
| 8,794,522 B2 | 8/2014 | Ehrhart | |
| 8,794,525 B2 | 8/2014 | Amundsen et al. | |
| 8,794,526 B2 | 8/2014 | Wang et al. | |
| 8,798,367 B2 | 8/2014 | Ellis | |
| 8,807,431 B2 | 8/2014 | Wang et al. | |
| 8,807,432 B2 | 8/2014 | Van Horn et al. | |
| 8,820,630 B2 | 9/2014 | Qu et al. | |
| 8,822,848 B2 | 9/2014 | Meagher | |
| 8,824,692 B2 | 9/2014 | Sheerin et al. | |
| 8,824,696 B2 | 9/2014 | Braho | |
| 8,842,849 B2 | 9/2014 | Wahl et al. | |
| 8,844,822 B2 | 9/2014 | Kotlarsky et al. | |
| 8,844,823 B2 | 9/2014 | Fritz et al. | |
| 8,849,019 B2 | 9/2014 | Li et al. | |
| D716,285 S | 10/2014 | Chaney et al. | |
| 8,851,383 B2 | 10/2014 | Yeakley et al. | |
| 8,854,633 B2 | 10/2014 | Laffargue | |
| 8,866,963 B2 | 10/2014 | Grunow et al. | |
| 8,868,421 B2 | 10/2014 | Braho et al. | |
| 8,868,519 B2 | 10/2014 | Maloy et al. | |
| 8,868,802 B2 | 10/2014 | Barten | |
| 8,868,803 B2 | 10/2014 | Caballero | |
| 8,870,074 B1 | 10/2014 | Gannon | |
| 8,879,639 B2 | 11/2014 | Sauerwein | |
| 8,880,426 B2 | 11/2014 | Smith | |
| 8,881,983 B2 | 11/2014 | Havens et al. | |
| 8,881,987 B2 | 11/2014 | Wang | |
| 8,903,172 B2 | 12/2014 | Smith | |
| 8,908,995 B2 | 12/2014 | Benos et al. | |
| 8,910,870 B2 | 12/2014 | Li et al. | |

(56) References Cited

U.S. PATENT DOCUMENTS

| | | |
|---|---|---|
| 8,910,875 B2 | 12/2014 | Ren et al. |
| 8,914,290 B2 | 12/2014 | Hendrickson et al. |
| 8,914,788 B2 | 12/2014 | Pettinelli et al. |
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| D733,112 S | 6/2015 | Chaney et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber et al. |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,070,032 B2 | 6/2015 | Corcoran |
| D734,339 S | 7/2015 | Zhou et al. |
| D734,751 S | 7/2015 | Oberpriller et al. |
| 9,082,023 B2 | 7/2015 | Feng et al. |
| 9,224,022 B2 | 12/2015 | Ackley et al. |
| 9,224,027 B2 | 12/2015 | Van Horn et al. |
| D747,321 S | 1/2016 | London et al. |
| 9,230,140 B1 | 1/2016 | Ackley |
| 9,250,712 B1 | 2/2016 | Todeschini |
| 9,258,033 B2 | 2/2016 | Showering |
| 9,262,633 B1 | 2/2016 | Todeschini et al. |
| 9,310,609 B2 | 4/2016 | Rueblinger et al. |
| D757,009 S | 5/2016 | Oberpriller et al. |
| 9,342,724 B2 | 5/2016 | McCloskey |
| 9,375,945 B1 | 6/2016 | Bowles |
| D760,719 S | 7/2016 | Zhou et al. |
| 9,390,596 B1 | 7/2016 | Todeschini |
| D762,604 S | 8/2016 | Fitch et al. |
| D762,647 S | 8/2016 | Fitch et al. |
| 9,412,242 B2 | 8/2016 | Van Horn et al. |
| D766,244 S | 9/2016 | Zhou et al. |
| 9,443,123 B2 | 9/2016 | Hejl |
| 9,443,222 B2 | 9/2016 | Singel et al. |
| 9,478,113 B2 | 10/2016 | Xie et al. |
| 2007/0063048 A1 | 3/2007 | Havens et al. |
| 2008/0203164 A1* | 8/2008 | DiFazio ............. G06K 7/10851 235/454 |
| 2009/0134221 A1 | 5/2009 | Zhu et al. |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0294838 A1* | 11/2010 | Jolivet ............... G06K 7/10544 235/455 |
| 2011/0169999 A1 | 7/2011 | Grunow et al. |
| 2011/0202554 A1 | 8/2011 | Powilleit et al. |
| 2012/0111946 A1 | 5/2012 | Golant |
| 2012/0168512 A1 | 7/2012 | Kotlarsky et al. |
| 2012/0193423 A1 | 8/2012 | Samek |
| 2012/0203647 A1 | 8/2012 | Smith |
| 2012/0223141 A1 | 9/2012 | Good et al. |
| 2013/0043312 A1 | 2/2013 | Van Horn |
| 2013/0075168 A1 | 3/2013 | Amundsen et al. |
| 2013/0175341 A1 | 7/2013 | Kearney et al. |
| 2013/0175343 A1 | 7/2013 | Good |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0287258 A1 | 10/2013 | Kearney |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |
| 2013/0308625 A1 | 11/2013 | Park et al. |
| 2013/0313324 A1 | 11/2013 | Koziol et al. |
| 2013/0313325 A1 | 11/2013 | Wilz et al. |
| 2013/0342717 A1 | 12/2013 | Havens et al. |
| 2014/0001267 A1 | 1/2014 | Giordano et al. |
| 2014/0002828 A1 | 1/2014 | Laffargue et al. |
| 2014/0008439 A1 | 1/2014 | Wang |
| 2014/0025584 A1 | 1/2014 | Liu et al. |
| 2014/0034734 A1 | 2/2014 | Sauerwein |
| 2014/0036848 A1 | 2/2014 | Pease et al. |
| 2014/0039693 A1 | 2/2014 | Havens et al. |
| 2014/0042814 A1 | 2/2014 | Kather et al. |
| 2014/0049120 A1 | 2/2014 | Kohtz et al. |
| 2014/0049635 A1 | 2/2014 | Laffargue et al. |
| 2014/0061306 A1 | 3/2014 | Wu et al. |
| 2014/0063289 A1 | 3/2014 | Hussey et al. |
| 2014/0066136 A1 | 3/2014 | Sauerwein et al. |
| 2014/0067692 A1 | 3/2014 | Ye et al. |
| 2014/0070005 A1 | 3/2014 | Nahill et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078341 A1 | 3/2014 | Havens et al. |
| 2014/0078342 A1 | 3/2014 | Li et al. |
| 2014/0078345 A1 | 3/2014 | Showering |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |

(56) References Cited

U.S. PATENT DOCUMENTS

| | | |
|---|---|---|
| 2014/0104451 A1 | 4/2014 | Todeschini et al. |
| 2014/0106594 A1 | 4/2014 | Skvoretz |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0124577 A1 | 5/2014 | Wang et al. |
| 2014/0124579 A1 | 5/2014 | Ding |
| 2014/0125842 A1 | 5/2014 | Winegar |
| 2014/0125853 A1 | 5/2014 | Wang |
| 2014/0125999 A1 | 5/2014 | Longacre et al. |
| 2014/0129378 A1 | 5/2014 | Richardson |
| 2014/0131438 A1 | 5/2014 | Kearney |
| 2014/0131441 A1 | 5/2014 | Nahill et al. |
| 2014/0131443 A1 | 5/2014 | Smith |
| 2014/0131444 A1 | 5/2014 | Wang |
| 2014/0131445 A1 | 5/2014 | Ding et al. |
| 2014/0131448 A1 | 5/2014 | Xian et al. |
| 2014/0133379 A1 | 5/2014 | Wang et al. |
| 2014/0136208 A1 | 5/2014 | Maltseff et al. |
| 2014/0140585 A1 | 5/2014 | Wang |
| 2014/0151453 A1 | 6/2014 | Meier et al. |
| 2014/0152882 A1 | 6/2014 | Samek et al. |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0166759 A1 | 6/2014 | Liu et al. |
| 2014/0168787 A1 | 6/2014 | Wang et al. |
| 2014/0175165 A1 | 6/2014 | Havens et al. |
| 2014/0175172 A1 | 6/2014 | Jovanovski et al. |
| 2014/0191644 A1 | 7/2014 | Chaney |
| 2014/0191913 A1 | 7/2014 | Ge et al. |
| 2014/0197238 A1 | 7/2014 | Liu et al. |
| 2014/0197239 A1 | 7/2014 | Havens et al. |
| 2014/0197304 A1 | 7/2014 | Feng et al. |
| 2014/0203087 A1 | 7/2014 | Smith et al. |
| 2014/0204268 A1 | 7/2014 | Grunow et al. |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0231500 A1 | 8/2014 | Ehrhart et al. |
| 2014/0232930 A1 | 8/2014 | Anderson |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0270196 A1 | 9/2014 | Braho et al. |
| 2014/0270229 A1 | 9/2014 | Braho |
| 2014/0278387 A1 | 9/2014 | DiGregorio |
| 2014/0282210 A1 | 9/2014 | Bianconi |
| 2014/0284384 A1 | 9/2014 | Lu et al. |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0312121 A1 | 10/2014 | Lu et al. |
| 2014/0319220 A1 | 10/2014 | Coyle |
| 2014/0319221 A1 | 10/2014 | Oberpriller et al. |
| 2014/0326787 A1 | 11/2014 | Barten |
| 2014/0332590 A1 | 11/2014 | Wang et al. |
| 2014/0344943 A1 | 11/2014 | Todeschini et al. |
| 2014/0346233 A1 | 11/2014 | Liu et al. |
| 2014/0351317 A1 | 11/2014 | Smith et al. |
| 2014/0353373 A1 | 12/2014 | Van Horn et al. |
| 2014/0361073 A1 | 12/2014 | Qu et al. |
| 2014/0361082 A1 | 12/2014 | Xian et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2015/0001301 A1 | 1/2015 | Ouyang |
| 2015/0001304 A1 | 1/2015 | Todeschini |
| 2015/0003673 A1 | 1/2015 | Fletcher |
| 2015/0009338 A1 | 1/2015 | Laffargue et al. |
| 2015/0009610 A1 | 1/2015 | London et al. |
| 2015/0014416 A1 | 1/2015 | Kotlarsky et al. |
| 2015/0021397 A1 | 1/2015 | Rueblinger et al. |
| 2015/0028102 A1 | 1/2015 | Ren et al. |
| 2015/0028103 A1 | 1/2015 | Jiang |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0039309 A1 | 2/2015 | Braho et al. |
| 2015/0040378 A1 | 2/2015 | Saber et al. |
| 2015/0048168 A1 | 2/2015 | Fritz et al. |
| 2015/0049347 A1 | 2/2015 | Laffargue et al. |
| 2015/0051992 A1 | 2/2015 | Smith |
| 2015/0053766 A1 | 2/2015 | Havens et al. |
| 2015/0053768 A1 | 2/2015 | Wang et al. |
| 2015/0053769 A1 | 2/2015 | Thuries et al. |
| 2015/0062366 A1 | 3/2015 | Liu et al. |
| 2015/0063215 A1 | 3/2015 | Wang |
| 2015/0063676 A1 | 3/2015 | Lloyd et al. |
| 2015/0069130 A1 | 3/2015 | Gannon |
| 2015/0071819 A1 | 3/2015 | Todeschini |
| 2015/0083800 A1 | 3/2015 | Li et al. |
| 2015/0086114 A1 | 3/2015 | Todeschini |
| 2015/0088522 A1 | 3/2015 | Hendrickson et al. |
| 2015/0096872 A1 | 4/2015 | Woodburn |
| 2015/0099557 A1 | 4/2015 | Pettinelli et al. |
| 2015/0100196 A1 | 4/2015 | Hollifield |
| 2015/0102109 A1 | 4/2015 | Huck |
| 2015/0115035 A1 | 4/2015 | Meier et al. |
| 2015/0127791 A1 | 5/2015 | Kosecki et al. |
| 2015/0128116 A1 | 5/2015 | Chen et al. |
| 2015/0129659 A1 | 5/2015 | Feng et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0136854 A1 | 5/2015 | Lu et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0144701 A1 | 5/2015 | Xian et al. |
| 2015/0149946 A1 | 5/2015 | Benos et al. |
| 2015/0161429 A1 | 6/2015 | Xian |
| 2015/0169925 A1 | 6/2015 | Chen et al. |
| 2015/0169929 A1 | 6/2015 | Williams et al. |
| 2015/0186703 A1 | 7/2015 | Chen et al. |
| 2015/0193644 A1 | 7/2015 | Kearney et al. |
| 2015/0193645 A1 | 7/2015 | Colavito et al. |
| 2015/0199957 A1 | 7/2015 | Funyak et al. |
| 2015/0204671 A1 | 7/2015 | Showering |
| 2015/0210199 A1 | 7/2015 | Payne |
| 2015/0220753 A1 | 8/2015 | Zhu et al. |
| 2015/0254485 A1 | 9/2015 | Feng et al. |
| 2015/0327012 A1 | 11/2015 | Bian et al. |
| 2016/0014251 A1 | 1/2016 | Hejl |
| 2016/0040982 A1 | 2/2016 | Li et al. |
| 2016/0042241 A1 | 2/2016 | Todeschini |
| 2016/0057230 A1 | 2/2016 | Todeschini et al. |
| 2016/0109219 A1 | 4/2016 | Ackley et al. |
| 2016/0109220 A1 | 4/2016 | Laffargue |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0125873 A1 | 5/2016 | Braho et al. |
| 2016/0133253 A1 | 5/2016 | Braho et al. |
| 2016/0171720 A1 | 6/2016 | Todeschini |
| 2016/0178479 A1 | 6/2016 | Goldsmith |
| 2016/0180678 A1 | 6/2016 | Ackley et al. |
| 2016/0189087 A1 | 6/2016 | Morton et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |

(56) References Cited

U.S. PATENT DOCUMENTS

2016/0314276 A1 10/2016 Wilz, Sr. et al.
2016/0314294 A1 10/2016 Kubler et al.

FOREIGN PATENT DOCUMENTS

WO 2014019130 A1 2/2014
WO 2014110495 A1 7/2014

OTHER PUBLICATIONS

U.S. Appl. No. 29/525,068 for Tablet Computer With Removable Scanning Device filed Apr. 27, 2015 (Schulte et al.); 19 pages.
U.S. Appl. No. 29/468,118 for an Electronic Device Case, filed Sep. 26, 2013 (Oberpriller et al.); 14 pages.
U.S. Appl. No. 29/530,600 for Cyclone filed Jun. 18, 2015 (Vargo et al); 16 pages.
U.S. Appl. No. 14/707,123 for Application Independent DEX/UCS Interface filed May 8, 2015 (Pape); 47 pages.
U.S. Appl. No. 14/283,282 for Terminal Having Illumination and Focus Control filed May 21, 2014 (Liu et al.); 31 pages; now abandoned.
U.S. Appl. No. 14/705,407 for Method and System to Protect Software-Based Network-Connected Devices From Advanced Persistent Threat filed May 6, 2015 (Hussey et al.); 42 pages.
U.S. Appl. No. 14/704,050 for Intermediate Linear Positioning filed May 5, 2015 (Charpentier et al.); 60 pages.
U.S. Appl. No. 14/705,012 for Hands-Free Human Machine Interface Responsive to a Driver of a Vehicle filed May 6, 2015 (Fitch et al.); 44 pages.
U.S. Appl. No. 14/715,672 for Augumented Reality Enabled Hazard Display filed May 19, 2015 (Venkatesha et al.); 35 pages.
U.S. Appl. No. 14/735,717 for Indicia-Reading Systems Having an Interface With a User's Nervous System filed Jun. 10, 2015 (Todeschini); 39 pages.
U.S. Appl. No. 14/702,110 for System and Method for Regulating Barcode Data Injection Into a Running Application on a Smart Device filed May 1, 2015 (Todeschini et al.); 38 pages.
U.S. Appl. No. 14/747,197 for Optical Pattern Projector filed Jun. 23, 2015 (Thuries et al.); 33 pages.
U.S. Appl. No. 14/702,979 for Tracking Battery Conditions filed May 4, 2015 (Young et al.); 70 pages.
U.S. Appl. No. 29/529,441 for Indicia Reading Device filed Jun. 8, 2015 (Zhou et al.); 14 pages.
U.S. Appl. No. 14/747,490 for Dual-Projector Three-Dimensional Scanner filed Jun. 23, 2015 (Jovanovski et al.); 40 pages.
U.S. Appl. No. 14/740,320 for Tactile Switch for a Mobile Electronic Device filed Jun. 16, 2015 (Bamdringa); 38 pages.
U.S. Appl. No. 14/740,373 for Calibrating a Volume Dimensioner filed Jun. 16, 2015 (Ackley et al.); 63 pages.
U.S. Appl. No. 13/367,978, filed Feb. 7, 2012, (Feng et al.); now abandoned.
U.S. Appl. No. 14/277,337 for Multipurpose Optical Reader, filed May 14, 2014 (Jovanovski et al.); 59 pages; now abandoned.
U.S. Appl. No. 14/446,391 for Multifunction Point of Sale Apparatus With Optical Signature Capture filed Jul. 30, 2014 (Good et al.); 37 pages; now abandoned.
U.S. Appl. No. 29/516,892 for Table Computer filed Feb. 6, 2015 (Bidwell et al.); 13 pages.
U.S. Appl. No. 29/523,098 for Handle for a Tablet Computer filed Apr. 7, 2015 (Bidwell et al.); 17 pages.
U.S. Appl. No. 29/528,890 for Mobile Computer Housing filed Jun. 2, 2015 (Fitch et al.); 61 pages.
U.S. Appl. No. 29/526,918 for Charging Base filed May 14, 2015 (Fitch et al.); 10 pages.

\* cited by examiner

CANCELLING NOISE CAUSED BY THE FLICKER OF AMBIENT LIGHTS

CROSS-REFERENCE TO RELATED APPLICATION

The present application claims the benefit of Chinese Patent Application for Utility Model No. 201520726980.3 for Cancelling Noise Caused by the Flicker of Ambient Lights filed with SIPO on Sep. 18, 2015, now Chinese Patent No. ZL201520726980.3. Each of the foregoing patent application and patent is hereby incorporated by reference in its entirety.

FIELD OF THE INVENTION

The present invention relates to noise cancellation and more particularly relates to ambient light flickering noise cancellation for barcode scanners.

BACKGROUND

Generally speaking, energy saving light sources, such as compact fluorescent lamps (CFLs) and light emitting diode (LED) lamps, have become more popular in recent years. With these light sources, however, more working areas are subjected to ambient light having high frequency flickering. Laser-based barcode scanners can experience difficulty functioning properly as a result of such flickering light interference.

The flicker from ambient lights in the vicinity of laser-based barcode scanners can introduce noise or interference into the scanned optical signals of the barcode scanners. For instance, fluorescent lights have high-frequency electronic ballasts and light emitting diode (LED) lamps have high-frequency drivers. These high-frequency components generate pulsed illumination on barcode symbols. This pulsed illumination can be received by the barcode scanner as optical noise. The noise can introduce false edge detection, which can result in difficult or incorrect decoding of the barcode by the barcode scanning circuitry.

FIGS. 1A and 1B are graphs derived from screen shots obtained during a signal analysis test to determine the noise from ambient lights and the subsequent interference to the proper scanning processes of laser-based barcode scanning devices. Graph 10 of FIG. 1A shows signals received from a first barcode scanning process. In the first process, the barcode scan signals were obtained when a particular ambient light was turned off. Graph 12 of FIG. 1B was derived from signals received from another barcode scanning process when the ambient light was turned on. Specifically, the barcode scan signals were obtained using a Honeywell model 1200g laser scanner and the ambient light was a Philips LED desk lamp model 69195. As can be seen from the barcode scan signals obtained in the signal analysis test, the presence of the LED lamp in the vicinity of the barcode reader creates such noise that a barcode cannot be decoded.

Therefore, a need exists for laser-based barcode scanners or barcode readers to operate properly in the vicinity of high-frequency flicker illumination of certain types of ambient light sources.

SUMMARY

Accordingly, in one aspect, the present invention embraces a barcode scanning device, which comprises a light source, a first sensor, a second sensor, and a noise cancelling circuit. The light source is configured to emit a beam of light. The first sensor is configured to detect a first optical signal indicative of light reflecting off of a barcode. The reflected light originates from the light source and from at least one ambient light source in the vicinity of the barcode scanning device. The second sensor is configured to detect a second optical signal indicative of light originating from the at least one ambient light source. The noise cancelling circuit is configured to obtain a noise-cancelled scanning signal from the first and second optical signals.

In another exemplary embodiment, a laser scanning apparatus is provided. The laser scanning apparatus comprises a housing, a laser source, a first photodiode, a second photodiode, and a noise cancelling circuit. The laser source is configured to emit a beam of laser light to be scanned across a barcode. The first photodiode is disposed in the housing and is configured to detect a first optical signal indicative of at least laser light reflecting off of the barcode. The second photodiode is disposed outside the housing in the vicinity of the first photodiode and is configured to sense a second optical signal. The noise cancelling circuit is configured to obtain a noise-cancelled scanning signal from the first and second optical signals. The first and second photodiodes are configured to receive light originating from at least one ambient source.

In yet another exemplary embodiment, a noise cancellation circuit is provided. The noise cancellation circuit comprises at least one optical sensor and a differential amplifier. The at least one optical sensor is configured to detect a first optical signal in a first stage and detect a second optical signal in a second stage. The first optical signal comprises a laser scanning component and a noise component, and the second optical signal comprises just the noise component. The differential amplifier is configured to subtract the second optical signal from the first optical signal to thereby remove the noise component from the first optical signal. The noise component corresponds to ambient light from at least one ambient light source. The differential amplifier is configured to output a noise-cancelled scanning signal.

The foregoing illustrative summary, as well as other exemplary objectives and/or advantages of the invention, and the manner in which the same are accomplished, are further explained within the following detailed description and its accompanying drawings.

BRIEF DESCRIPTION OF THE DRAWINGS

FIG. 1B schematically depicts a screen shot showing a second barcode scan signal obtained during the signal analysis test when the ambient light was turned on.

DETAILED DESCRIPTION

The present invention embraces systems and methods for cancelling noise components of optical signals, specifically optical signals obtained by a laser scanner. In some embodiments of the present disclosure, one or more reference sensors are used in conjunction with a conventional light sensor of a laser scanner. The reference sensors are configured to detect only ambient light from sources other than the desired laser source. The detected ambient light is subtracted from the laser scan signal to provide a desired noise-cancelled signal. In other embodiments of the present disclosure, noise cancellation circuits include delay lines, sample and hold circuits, filters and other electrical components to cancel the noise components from the laser scan signals.

Figure 1A:
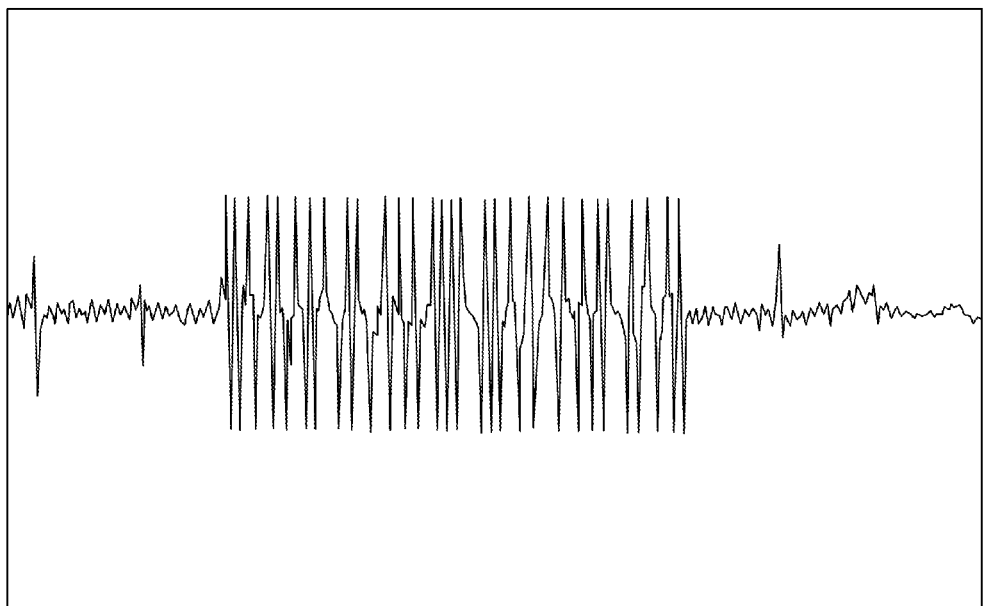
FIG. 1A schematically depicts a screen shot showing a first barcode scan signal obtained during a signal analysis test when an ambient light was turned off.
Figure 1B:
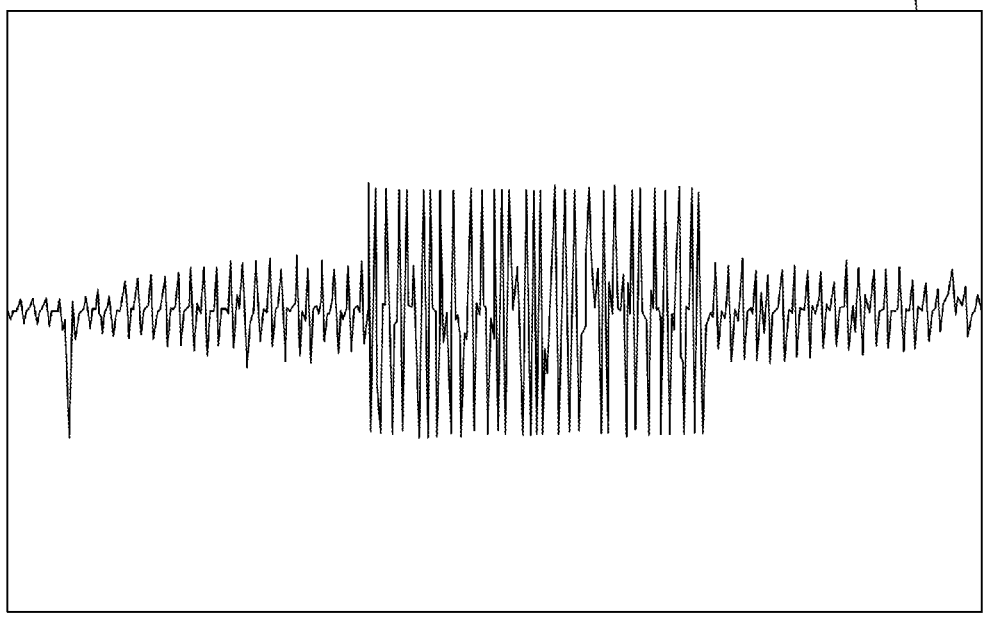
Figure 2:
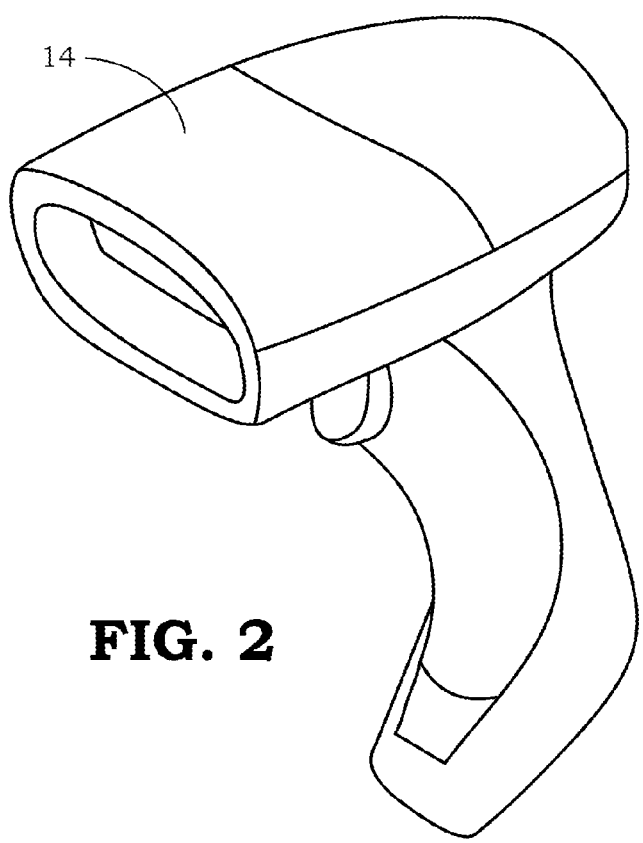
FIG. 2 schematically depicts a perspective view of a laser barcode scanner according to one embodiment of the present invention.

FIG. 2, according to an exemplary implementation, is a perspective view of an embodiment of a laser-based barcode scanner 14, or barcode reader. The barcode scanner 14 may be referred to as a retro system scanner. The embodiments of the present disclosure refer to noise cancellation for retro system scanners, although at least one implementation can be applicable for non-retro system scanners, as explained in more detail below.

Figure 3:
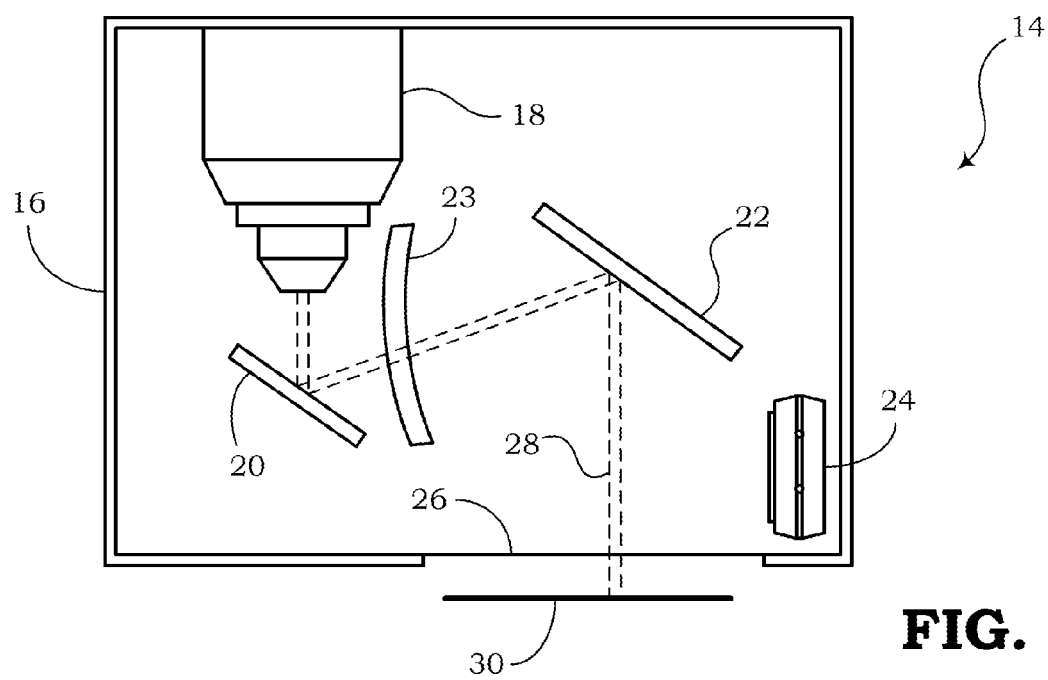
FIG. 3 schematically depicts a cut-away side view of a barcode reader according to one embodiment of the present invention.

FIG. 3 is a cut-away side view of an embodiment of the elements disposed in the laser-based barcode scanner 14 shown in FIG. 2. The elements of the embodiment of FIG. 3 can also be applicable to other types of retro system scanners. In the embodiment of FIG. 3, the barcode scanner 14 includes a housing 16, a laser source 18, a first mirror 20, a second mirror 22, a parabolic collector 23, a light sensor 24, and a window 26 formed in one side of the housing 16.

The laser source 18 is configured to emit a beam of light 28 that is reflected off of the first mirror 20, passed through an opening in the parabolic collector 23, reflected off of the second mirror 22, exited from the housing 16 through the window 26, and projected onto a barcode 30. Mirror 22 can be moved in such a way so as to enable the beam of light 28 to be scanned across the barcode 30. The light sensor 24 may be a photodiode or other suitable light sensing device and is configured to detect light from the beam of light 28 reflected off of the barcode 30, reflected off the second mirror 22 a second time, and reflected off of and focused by the parabolic collector 23. In FIG. 3, a side view of the light sensor 24 is illustrated.

Figure 4A:
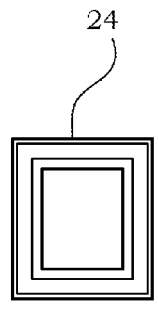
FIG. 4A schematically depicts a front view of a first sensor arrangement including the sensor shown in FIG. 3 according to an embodiment of the present invention.

FIG. 4A is a front view of the light sensor 24 shown in FIG. 3. In this sensor arrangement, a single light sensor 24 is used to detect the light reflection from the barcode 30. The light sensor 24 is positioned within the housing 16 to receive the reflected light originating from the laser source 18.

Figure 4B:
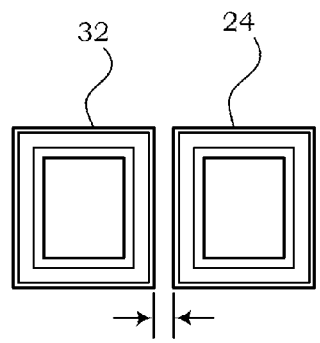
FIG. 4B schematically depicts a front view of a second sensor arrangement including the sensor shown in FIG. 3 and a reference sensor according to an embodiment of the present invention.

FIG. 4B is a front view of a group of sensors that are configured in another sensor arrangement according to the teachings of the present disclosure. This sensor arrangement of FIG. 4B includes the light sensor 24 disposed within the housing 16 of the barcode reader 14. In this embodiment, a reference sensor 32 is connected to the housing 16 and is positioned either inside or outside of the housing 16. The reference sensor is positioned with an offset from the light sensor 24 to keep away from the scanning beam reflection. However, the reference sensor 32 is close enough to the light sensor 24 to collect ambient light reflected off of the nearby barcode 30, which is then reflected off of the second mirror 22 and parabolic collector 23.

The reference sensor 32 may be positioned adjacent to or proximate to the light sensor 24 and may be positioned on either side of the light sensor 24. The reference sensor 32 may be a light sensor similar to the light sensor 24 and may include one or more photodiodes. Particularly, with the reference sensor 32 offset from the light sensor 24, the reference sensor 32 is configured to sense ambient light from ambient light sources and sense very little, if any, of the light reflected from the barcode 30.

Figure 4C:
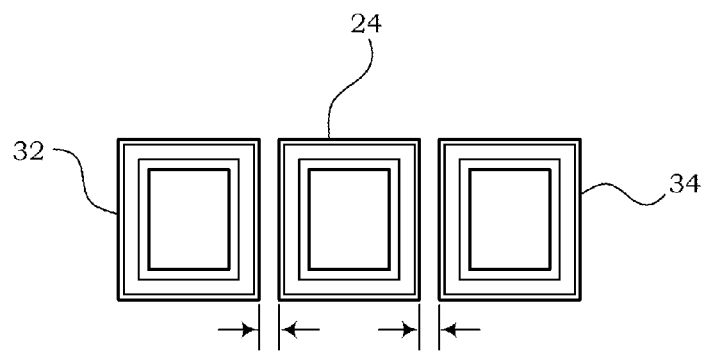
FIG. 4C schematically depicts a front view of a third sensor arrangement including the sensor shown in FIG. 3 and two reference sensors according to another embodiment of the present invention.

FIG. 4C is a front view of another group of sensors that are configured in yet another sensor arrangement according to the teachings of the present disclosure. The sensor arrangement of FIG. 4C includes the light sensor 24 disposed within the housing 16 of the barcode reader 14, as discussed above. In addition, first and second reference sensors 32, 34 are included in the sensor arrangement. The first and second reference sensors 32, 34 are connected to the housing 16 and may be positioned inside or outside of the housing 16. The first and second reference sensors 32, 34 are positioned with an offset from the light sensor 24 to keep away from the scanning beam reflection. The first and second reference sensors 32, 34 collect ambient light reflected from the nearby barcode 30, which is also reflected off of the second mirror 22 and parabolic collector 23.

The reference sensors 32, 34 may be positioned adjacent to the first light sensor 24 on opposite sides of the light sensor 24. The reference sensors 32, 34 may be configured as light sensors and each include one or more photodiodes. The reference sensors 32, 34 are configured to sense ambient light from sources other than the laser source 18.

Figure 5:
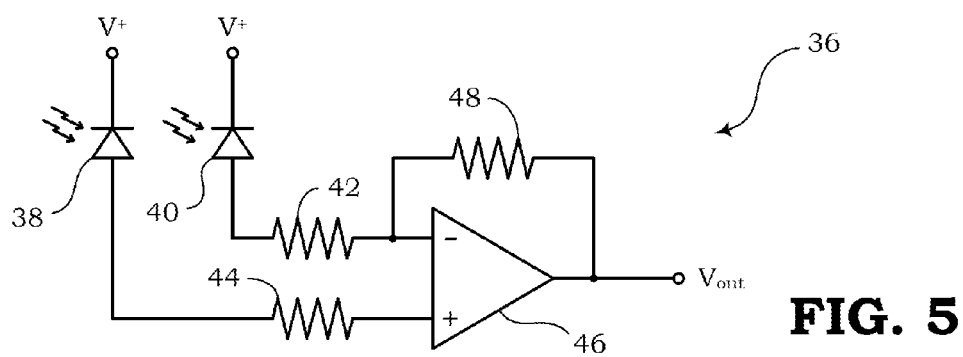
FIG. 5 schematically depicts a circuit diagram of a noise cancellation circuit according to a first embodiment of the present invention.

FIG. 5 is a circuit diagram of a first embodiment of a noise cancellation circuit 36, which may be contained within the housing 16 of the laser-based barcode reader 14. The noise cancellation circuit 36 may alternatively be disposed in a processing device separate from the barcode reader 14. The noise cancellation circuit 36 of the embodiment of FIG. 5 includes a first photodiode 38, a second photodiode 40, an operational amplifier 46, and resistors 42, 44, and 48. The first photodiode 38 corresponds to a light sensor (e.g., light sensor 24) that is normally configured to sense reflected light from a scanned barcode. The second photodiode 40 corresponds to one or more light sensors (e.g., one or both of reference sensors 32, 34) used in accordance with the teachings of the present disclosure. The second photodiode 40 is therefore configured as a reference to sense ambient light.

The operational amplifier 46 is arranged in the noise cancellation circuit 36 as a differential amplifier for subtracting the light signal received by the second photodiode 40 from the light signal received by the first photodiode 38. The first photodiode 38 receives not only the light reflected from the barcode but also ambient light as well. The second photodiode 40 mainly receives just the ambient light. The difference signal output at $V_{out}$ is the scanned barcode signal with the ambient light noise signal removed. The operational amplifier 46 can be fine-tuned by tuning the bias setting of the amplifier 46 to achieve exact cancellation.

Figure 6:
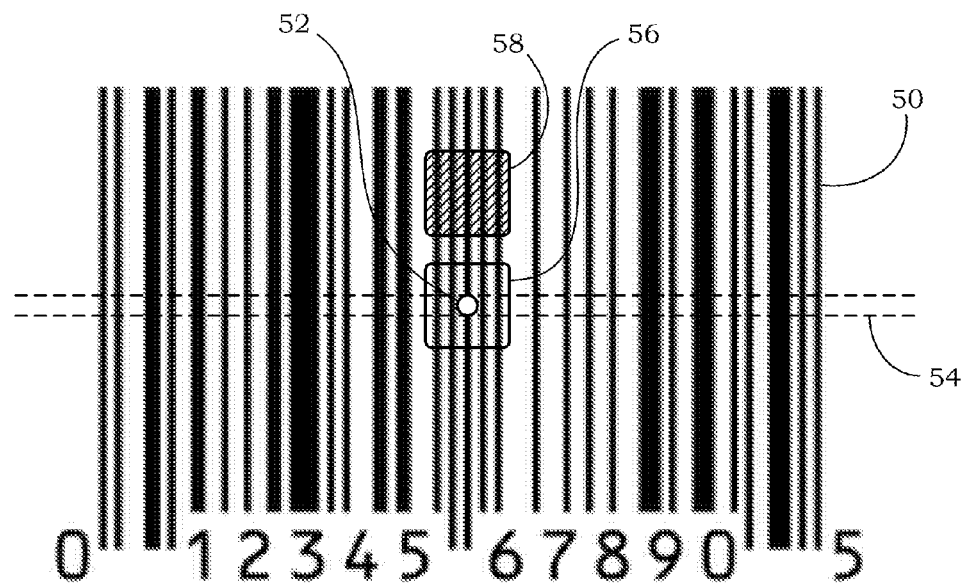
FIG. 6 schematically depicts a view of a barcode and each sensor's field of view of the barcode for the sensor arrangement shown in FIG. 4B, according to an embodiment of the present invention.

FIG. 6 is a view of a barcode 50 to be scanned according to the present invention. A light beam (e.g., beam of light 28 from FIG. 3) is directed onto the barcode 50 as a spot 52. The light beam is moved substantially perpendicular to the bars of the barcode 50 along a path 54. The light sensor 24 shown in FIGS. 3 and 4 has a field of view 56 with respect to the barcode 50 that surrounds the spot 52. The field of view 56 may include a substantially rectangular or square sensing area on the barcode 50 that is moved as the spot 52 is scanned across the barcode 50. The reference sensor 32 shown in FIG. 4B also has a field of view 58 with respect to the barcode 50. The field of view 58 of the reference sensor 32 remains proximate or adjacent to the field of view 56 of the light sensor 24 and moves as the spot 52 is scanned across the barcode 50.

The difference between the two fields of view 56, 58 is that the first field of view 56 includes a view of the reflection of light from the laser source 18 and from any ambient light imposed on the barcode 50 while the second field of view 58 includes a view of only the reflection from the ambient light imposed on the barcode 50. Again, when the signals obtained from the two different fields of view 56, 58 are applied to the differential amplifier 46 shown in the noise cancellation circuit 36 of FIG. 5, the ambient light signal is cancelled out and only the laser light signal remains.

Figure 7:
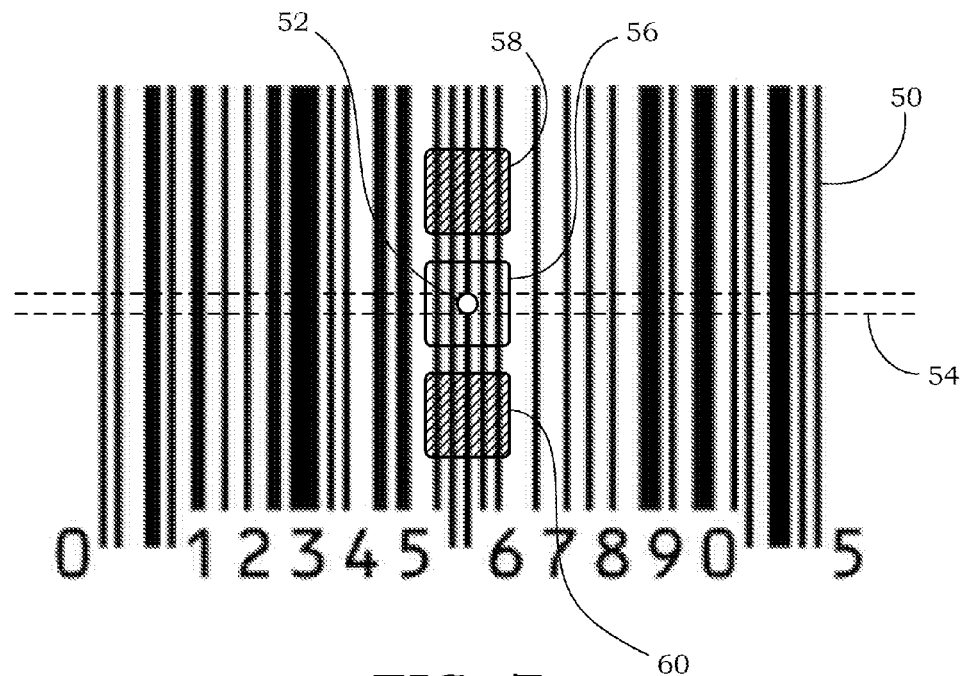
FIG. 7 schematically depicts a view of the barcode and each sensor's field of view of the barcode for the sensor arrangement shown in FIG. 4C, according to an embodiment of the present invention.

FIG. 7 is a view of the barcode 50 according to the sensor arrangement shown in FIG. 4C. The fields of view 56 and 58 as shown in FIG. 6, which are associated with the light sensor 24 and reference sensor 32 of FIGS. 4B and 4C, are the same in FIG. 7. In addition, however, a third sensor (e.g., reference sensor 34 shown in FIG. 4C) has a third field of view 60 on the other side of the field of view 56 from the field of view 58. The fields of view 56, 58, and 60 correspond to the sensor arrangement of the light sensor 24, first reference sensor 32, and second reference sensor 34, respectively.

The fields of view 58 and 60 correspond to sensors for sensing ambient light only. The ambient light signals may be averaged or combined to obtain a single signal representing a total ambient light signal. This total ambient light signal can be subtracted from the signal obtained from the field of view 56 to cancel the ambient light noise component. The subtraction process can be executed using the noise cancellation circuit 36 of FIG. 5 or other circuit as explained in more detail below. In this respect, the photodiode 40 shown in FIG. 5 may be configured as two photodiodes that receive light within the fields of view 58, 60 shown in FIG. 7.

Figure 8:
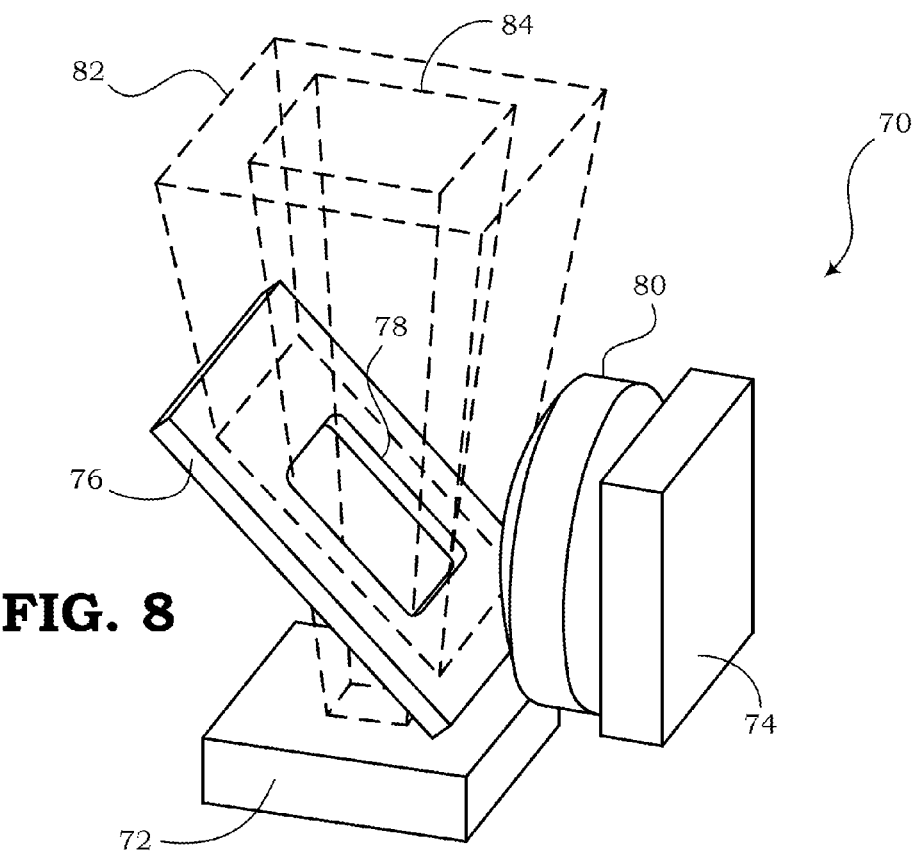
FIG. 8 schematically depicts a perspective view of a fourth sensor arrangement, according to an embodiment of the present invention.

FIG. 8 is a perspective view of an embodiment of a fourth sensor arrangement 70. In the sensor arrangement 70 of FIG. 8, a first photodiode 72 and second photodiode 74 are arranged substantially perpendicular to each other. The sensor arrangement 70 includes a mirror 76 having an aperture 78 in the middle of the mirror 76. The mirror 76 and aperture 78 may be substantially rectangular or may have any other suitable shapes.

Reflected ambient light 82, which is reflected off of the barcode 50, is directed to the mirror 76. Some of the reflected ambient light 82 radiates through the aperture 78 and is imposed on the first photodiode 72. At the same time, some of the reflected ambient light 82 is reflected off of the mirror 76 and focused by a lens 80 onto the second photodiode 74. In addition, reflected laser light 84, which is also reflected off of the barcode 50, is directed to the first photodiode 72. The aperture 78 may be configured such that it allows substantially all of the reflected laser light 84 to pass through the mirror 76 to the first photodiode 72. As mentioned above, the two signals obtained by the first and second photodiodes 72, 74 may be applied to a differential amplifier (e.g., amplifier 46) to cancel the noise of the ambient light from the barcode scanning process.

Figure 9:
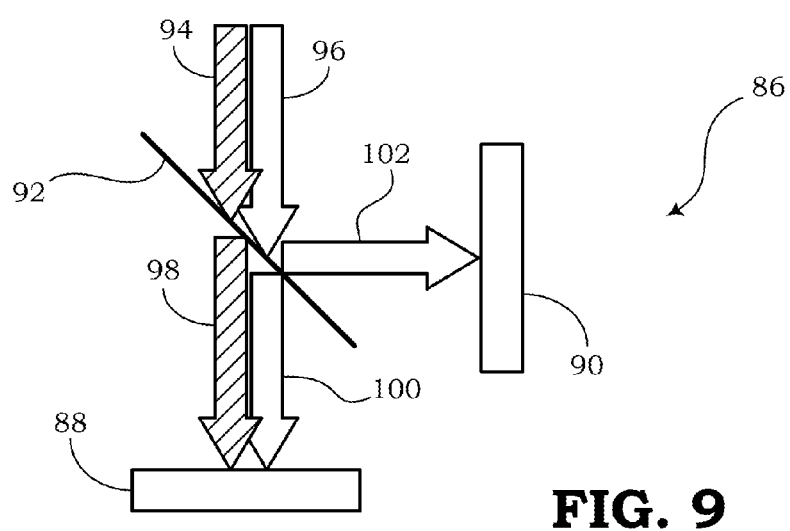
FIG. 9 schematically depicts a representation of light signals of a fifth sensor arrangement, according to an embodiment of the present invention.

FIG. 9 is a view of a sensor arrangement 86 according to yet another embodiment. In this embodiment, the sensor arrangement 86 includes a first photodiode 88 and second photodiode 90 arranged substantially perpendicular to each other, similar to the embodiment of FIG. 8. However, instead of the mirror 76 shown in FIG. 8, the embodiment of FIG. 9 includes a spectral beam splitter 92 interposed in the path of a reflected beam of laser light 94 and a reflected beam of ambient light 96.

The spectral beam splitter 92 is configured to pass the beam of laser light 94 while splitting the beam of ambient light 96. The laser light 94 passes through the spectral beam splitter 92 as a first beam 98. The ambient light 96 is equally split into a second beam 100, which passes through the spectral beam splitter 92, and a third beam 102, which is reflected by the spectral beam splitter 92. The first and second beams 98, 100 are imposed on the first photodiode 88 and the third beam 102 is imposed on the second photodiode 90. As mentioned above, the signals received by the first and second photodiodes 88, 90 can be applied to a differential amplifier to cancel the light signal from the third beam 102 from the signal made up of the first and second beams 98, 100. Since the split beams 100 and 102 are substantially the same, the signal output from the differential amplifier will be substantially equal to just the first beam 98 representing the laser light reflection.

Figure 10:
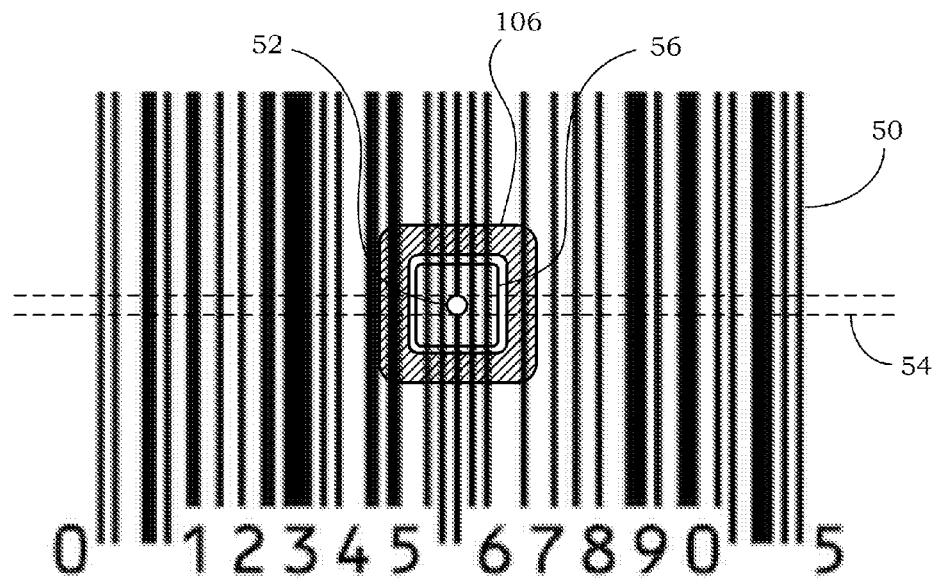
FIG. 10 schematically depicts a view of the barcode and each sensor's field of view of the barcode for the sensor arrangement shown in FIG. 8, according to an embodiment of the present invention.

FIG. 10 is a view of the barcode 50, which is also shown in FIGS. 6 and 7. In FIG. 10, the fields of view of the barcode correspond to each sensor's field of view from the sensor arrangement 70 of FIG. 8. The spot 52 from the light beam 28 is surrounded by the field of view 56 of the photodiode 72 shown in FIG. 8. A surrounding field of view 106 is also shown in FIG. 10 and represents the light reflected off of the mirror 76 on all sides of the aperture 78 and illuminated onto the second photodiode 74. As illustrated, there may be a small space between the periphery of the inner field of view (i.e., field of view 56) and the outer field of view (i.e., field of view 106). In this arrangement, the second photodiode 74 receives ambient light signals from all sides of the field of view 56 of the first photodiode 72.

Figure 11:
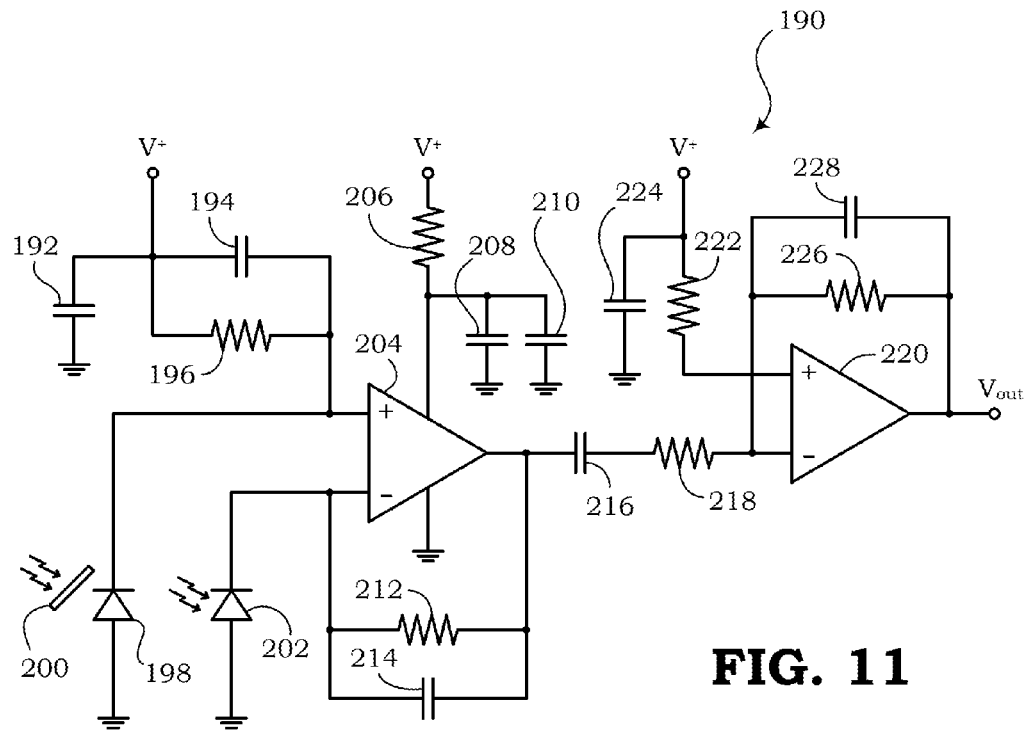
FIG. 11 schematically depicts a circuit diagram of a noise cancellation circuit according to a second embodiment of the present invention.

FIG. 11 is a circuit diagram of an embodiment of a second noise cancellation circuit 190. While many of the circuits disclosed in the present disclosure may be configured for user in a retro system scanner, such as a laser scanner similar in design to the laser barcode scanner 14 shown in FIG. 2, the circuit 190 of FIG. 11 may be used also in a non-retro system scanner.

The noise cancellation circuit 190 of FIG. 11 includes two operational amplifiers 204 and 220. The first operational amplifier 204 is configured in the circuit 190 as a differential amplifier for subtracting one light signal from another. The second operational amplifier 220 is configured in the circuit 190 as a negative feedback amplifier for providing a non-inverting amplified signal.

The noise cancellation circuit 190 also includes resistors 196, 206, 212, 218, 222, and 226 and capacitors 192, 194, 208, 210, 214, 216, 224, and 228. The noise cancellation circuit 190 also includes a first photodiode 198, which is configured with a laser filter lens 200, and a second photodiode 202. The first photodiode 198 with the laser filter lens 200 receives light signals with the frequency band that includes the laser light filtered out. Thus, the first photodiode 198 obtains essentially all frequencies of light except the band of laser frequencies. The second photodiode 202 receives light normally, including the laser frequencies and frequencies outside the range of laser frequencies. With the two sets of signals, the ambient noise frequencies from the first photodiode 198 can be cancelled out of the light signals received by the second photodiode 202.

FIGS. 5-11, which are described above, are directed to embodiments in which at least two light sensors or photodiodes are utilized to obtain differential signals for subtracting out the noise signals from the ambient lights. With respect to the following description, embodiments directed to laser scanners utilizing one light sensor are described. For instance, noise cancellation processes that are described below may utilize the single light sensor 24 shown in FIGS. 3 and 4A.

Figure 12:
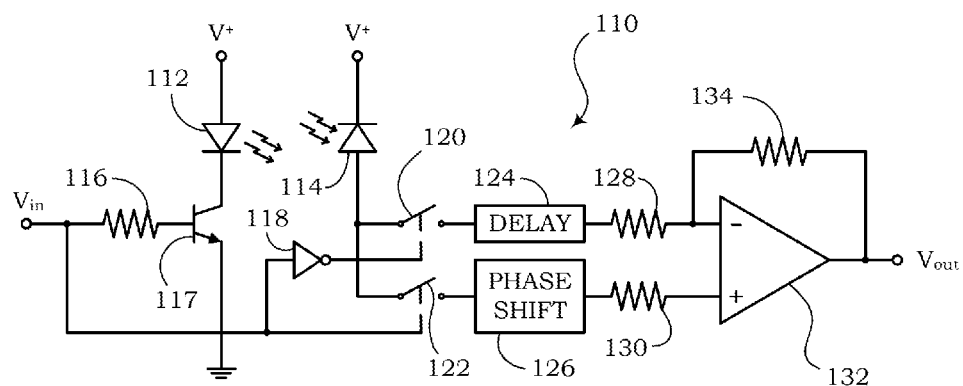
FIG. 12 schematically depicts a circuit diagram of a noise cancellation circuit according to a third embodiment of the present invention.

FIG. 12 is a circuit diagram of a noise cancellation circuit 110 according to an embodiment utilizing one photodiode. The noise cancellation circuit 110 of FIG. 12 includes a visible laser diode 112, photodiode 114, resistor 116, transistor 117, inverter 118, switches 120, 122, delay line circuit 124, phase shift circuit 126, resistors 128, 130, 134, and operational amplifier 132. The visible laser diode 112 may be configured as a laser source for a barcode reader, such as laser source 18 shown in FIG. 3.

In operation, a low input signal is applied to input $V_{in}$ which in turn is applied to the base or gate of transistor 117, thereby turning off the visible laser diode 112. Thus, the photodiode 114 receives light only from ambient light sources. The low $V_{in}$ signal is inverted to a high signal by the inverter 118, which thereby closes the switch 120. When switch 120 is closed, the signal from the photodiode 114 is provided to the delay line circuit 124, which delays the signal until a next stage of operation. This signal is referred to herein as a dark field signal, designating when the laser light or visible laser diode 112 is off.

During the next stage of operation, the $V_{in}$ signal is high, which turns the visible laser diode 112 on. In this case, the photodiode 114 receives both the light from ambient sources plus the light from the visible laser diode 112. The high $V_{in}$ signal closes switch 122, thereby applying the combined light signal from photodiode 114 to the phase shift circuit 126, which shifts the phase of the signal to match the delayed signal. At this point, the phase-shifted signal (i.e., including the combined light signal) is applied to the positive input of the differential amplifier 132 and the delayed signal (i.e., the dark field signal) is applied to the negative input of the differential amplifier 132. The output of the differential amplifier 132 (i.e., $V_{out}$) is the laser light signal with the ambient noise component cancelled.

According to another embodiment of a dark field noise cancellation circuit, the delay line circuit 124 shown in FIG. 12 may be replaced with an analog-to-digital converter and digital memory device for storing the dark field signal. The phase shift circuit 126 is this case may be unnecessary. The second light signal, which includes both the laser light component and ambient light component, may be applied to the positive input of the differential amplifier 132 and the stored dark field signal may be applied to the negative input of the differential amplifier 132 after digital-to-analog conversion. The delayed or stored signal component of ambient noise is subtracted from the second signal to obtain the noise-cancelled laser light signal.

Figure 13:
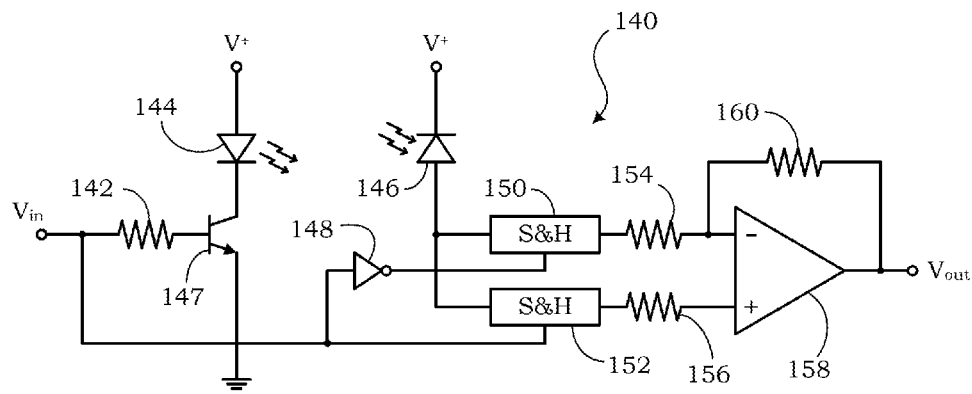
FIG. 13 schematically depicts a circuit diagram of a noise cancellation circuit according to a fourth embodiment of the present invention.

FIG. 13 is a circuit diagram of a noise cancellation circuit 140 according to a second embodiment utilizing one photodiode, according to the teachings of the present invention. The noise cancellation circuit 140 of FIG. 13 includes a resistor 142, visible laser diode 144, photodiode 146, transistor 147, inverter 148, sample and hold circuits 150, 152, resistors 154, 156, 160, and operational amplifier 158. Again, the visible laser diode 144 may be configured as the laser source 18 shown in FIG. 3.

The operation of the noise cancellation circuit 140 involves applying a high frequency modulation signal to input $V_{in}$. The modulation signal causes the transistor 147 to modulate the visible laser diode 144 to illuminate the photodiode 146 at a specific modulation frequency. To reduce additional noise, the modulation frequency is much higher than the frequency of both of the laser scanning signal and the ambient flicker noise signal. For example, the modulation frequency may be at least three times the frequency of the highest barcode scanning frequency.

When the modulation signal is low, the visible laser diode 144 is off and the first sample and hold circuit 150 is enabled to receive the signal from the photodiode 146 including just the ambient light. When the modulation signal is high, the visible laser diode 144 illuminates and the second sample and hold circuit 152 is enabled to receive the signal from the photodiode 146 including both the laser light and ambient light. The noise cancellation circuit 140 of FIG. 13 may further include signal delay lines with the sample and hold circuits 150, 152 and the outputs of the sample and hold circuits 150, 152 may be combined using a synchronized pre-amplifier for synchronizing the separate signals at the inputs of the differential amplifier 158. The differential amplifier 158 subtracts out the ambient light component and outputs just the laser light component.

Figure 14:
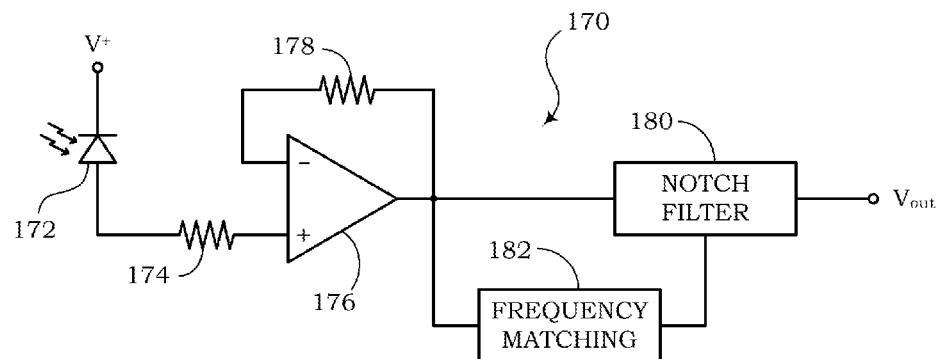
FIG. 14 schematically depicts a circuit diagram of a noise cancellation circuit according to a fifth embodiment of the present invention.

FIG. 14 is a circuit diagram of a noise cancellation circuit 170 according to another embodiment utilizing one photodiode. In FIG. 14, the noise cancellation circuit 170 includes a photodiode 172, resistor 174, operational amplifier 176, resistor 178, a notch filter 180, and a frequency matching circuit 182. The noise cancellation circuit 170 is an active filter circuit for filtering the noise component with the notch filter 180 having a narrow bandwidth. A filtering frequency can be selected based on the frequency of the flickering noise of the ambient lights and the frequency of the laser barcode scanning elements. In some embodiments, more than one frequency filter can be used, particularly if the ambient lights introduce more than one frequency of flicker illumination. Alternatively, a passive filtering circuit can be used to reduce the cost of the noise cancellation circuit 170.

Other circuits may be used for noise cancellation in light of the teachings of the present disclosure. In another example, a frequency hopping technique may be used in which the laser source (e.g., laser source 18) operates over an arbitrary pattern of different frequencies, such that noise at one frequency may only affect a small insignificant portion of the laser scanning process. Also, a phase shifting technique may be used to solve the decode problem of the prior art. Combining frequency hopping and phase shifting circuitry with other noise cancellation circuits, such as filtering and cancellation can further improve the laser scanner decode performance under flickering interference.

Therefore, modifications can be made to current laser barcode scanners to include ambient noise cancellation functionality to improve decode performance. Modifications can include adding a reference photodiode or adding a noise cancellation circuit to the existing circuitry. More sophisticated solutions can be implemented with customized optical components as well as ASIC design and development.

To supplement the present disclosure, this application incorporates entirely by reference the following commonly assigned patents, patent application publications, and patent applications:

U.S. Pat. Nos. 6,832,725; 7,128,266;
7,159,783; 7,413,127;
7,726,575; 8,294,969;
8,317,105; 8,322,622;
8,366,005; 8,371,507;
8,376,233; 8,381,979;
8,390,909; 8,408,464;
8,408,468; 8,408,469;
8,424,768; 8,448,863;
8,457,013; 8,459,557;
8,469,272; 8,474,712;
8,479,992; 8,490,877;
8,517,271; 8,523,076;
8,528,818; 8,544,737;
8,548,242; 8,548,420;
8,550,335; 8,550,354;
8,550,357; 8,556,174;
8,556,176; 8,556,177;
8,559,767; 8,599,957;
8,561,895; 8,561,903;
8,561,905; 8,565,107;
8,571,307; 8,579,200;
8,583,924; 8,584,945;
8,587,595; 8,587,697;
8,588,869; 8,590,789;
8,596,539; 8,596,542;
8,596,543; 8,599,271;
8,599,957; 8,600,158;
8,600,167; 8,602,309;
8,608,053; 8,608,071;
8,611,309; 8,615,487;
8,616,454; 8,621,123;
8,622,303; 8,628,013;
8,628,015; 8,628,016;
8,629,926; 8,630,491;
8,635,309; 8,636,200;
8,636,212; 8,636,215;
8,636,224; 8,638,806;
8,640,958; 8,640,960;
8,643,717; 8,646,692;
8,646,694; 8,657,200;
8,659,397; 8,668,149;
8,678,285; 8,678,286;
8,682,077; 8,687,282;
8,692,927; 8,695,880;
8,698,949; 8,717,494;
8,717,494; 8,720,783;
8,723,804; 8,723,904;
8,727,223; D702,237;
8,740,082; 8,740,085;
8,746,563; 8,750,445;
8,752,766; 8,756,059;
8,757,495; 8,760,563;
8,763,909; 8,777,108;
8,777,109; 8,779,898;
8,781,520; 8,783,573;
8,789,757; 8,789,758;
8,789,759; 8,794,520;
8,794,522; 8,794,525;
8,794,526; 8,798,367;
8,807,431; 8,807,432;
8,820,630; 8,822,848;
8,824,692; 8,824,696;
8,842,849; 8,844,822;
8,844,823; 8,849,019;
8,851,383; 8,854,633;
8,866,963; 8,868,421;
8,868,519; 8,868,802;
8,868,803; 8,870,074;
8,879,639; 8,880,426;
8,881,983; 8,881,987;
8,903,172; 8,908,995;
8,910,870; 8,910,875;
8,914,290; 8,914,788;
8,915,439; 8,915,444;
8,916,789; 8,918,250;
8,918,564; 8,925,818;
8,939,374; 8,942,480;
8,944,313; 8,944,327;
8,944,332; 8,950,678;
8,967,468; 8,971,346;
8,976,030; 8,976,368;
8,978,981; 8,978,983;
8,978,984; 8,985,456;
8,985,457; 8,985,459;
8,985,461; 8,988,578;
8,988,590; 8,991,704;
8,996,194; 8,996,384;
9,002,641; 9,007,368;
9,010,641; 9,015,513;
9,016,576; 9,022,288;
9,030,964; 9,033,240;
9,033,242; 9,036,054;
9,037,344; 9,038,911;
9,038,915; 9,047,098;
9,047,359; 9,047,420;
9,047,525; 9,047,531;
9,053,055; 9,053,378;
9,053,380; 9,058,526;
9,064,165; 9,064,167;
9,064,168; 9,064,254;
9,066,032; 9,070,032;
U.S. Design Pat. No. D716,285;
U.S. Design Pat. No. D723,560;
U.S. Design Pat. No. D730,357;
U.S. Design Pat. No. D730,901;
U.S. Design Pat. No. D730,902
U.S. Design Pat. No. D733,112;
U.S. Design Pat. No. D734,339;
International Publication No. 2013/163789;
International Publication No. 2013/173985;

International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2010/0265880;
U.S. Patent Application Publication No. 2011/0202554;
U.S. Patent Application Publication No. 2012/0111946;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0342717;
U.S. Patent Application Publication No. 2014/0001267;
U.S. Patent Application Publication No. 2014/0008439;
U.S. Patent Application Publication No. 2014/0025584;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0076974;
U.S. Patent Application Publication No. 2014/0078341;
U.S. Patent Application Publication No. 2014/0078345;
U.S. Patent Application Publication No. 2014/0097249;
U.S. Patent Application Publication No. 2014/0098792;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;
U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0166755;
U.S. Patent Application Publication No. 2014/0166759;
U.S. Patent Application Publication No. 2014/0168787;
U.S. Patent Application Publication No. 2014/0175165;
U.S. Patent Application Publication No. 2014/0175172;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0214631;
U.S. Patent Application Publication No. 2014/0217166;
U.S. Patent Application Publication No. 2014/0217180;
U.S. Patent Application Publication No. 2014/0231500;
U.S. Patent Application Publication No. 2014/0232930;
U.S. Patent Application Publication No. 2014/0247315;
U.S. Patent Application Publication No. 2014/0263493;
U.S. Patent Application Publication No. 2014/0263645;
U.S. Patent Application Publication No. 2014/0267609;
U.S. Patent Application Publication No. 2014/0270196;
U.S. Patent Application Publication No. 2014/0270229;
U.S. Patent Application Publication No. 2014/0278387;
U.S. Patent Application Publication No. 2014/0278391;
U.S. Patent Application Publication No. 2014/0282210;
U.S. Patent Application Publication No. 2014/0284384;
U.S. Patent Application Publication No. 2014/0288933;
U.S. Patent Application Publication No. 2014/0297058;
U.S. Patent Application Publication No. 2014/0299665;
U.S. Patent Application Publication No. 2014/0312121;
U.S. Patent Application Publication No. 2014/0319220;
U.S. Patent Application Publication No. 2014/0319221;
U.S. Patent Application Publication No. 2014/0326787;
U.S. Patent Application Publication No. 2014/0332590;
U.S. Patent Application Publication No. 2014/0344943;
U.S. Patent Application Publication No. 2014/0346233;
U.S. Patent Application Publication No. 2014/0351317;
U.S. Patent Application Publication No. 2014/0353373;
U.S. Patent Application Publication No. 2014/0361073;
U.S. Patent Application Publication No. 2014/0361082;
U.S. Patent Application Publication No. 2014/0362184;
U.S. Patent Application Publication No. 2014/0363015;
U.S. Patent Application Publication No. 2014/0369511;
U.S. Patent Application Publication No. 2014/0374483;
U.S. Patent Application Publication No. 2014/0374485;
U.S. Patent Application Publication No. 2015/0001301;

U.S. Patent Application Publication No. 2015/0001304;
U.S. Patent Application Publication No. 2015/0003673;
U.S. Patent Application Publication No. 2015/0009338;
U.S. Patent Application Publication No. 2015/0009610;
U.S. Patent Application Publication No. 2015/0014416;
U.S. Patent Application Publication No. 2015/0021397;
U.S. Patent Application Publication No. 2015/0028102;
U.S. Patent Application Publication No. 2015/0028103;
U.S. Patent Application Publication No. 2015/0028104;
U.S. Patent Application Publication No. 2015/0029002;
U.S. Patent Application Publication No. 2015/0032709;
U.S. Patent Application Publication No. 2015/0039309;
U.S. Patent Application Publication No. 2015/0039878;
U.S. Patent Application Publication No. 2015/0040378;
U.S. Patent Application Publication No. 2015/0048168;
U.S. Patent Application Publication No. 2015/0049347;
U.S. Patent Application Publication No. 2015/0051992;
U.S. Patent Application Publication No. 2015/0053766;
U.S. Patent Application Publication No. 2015/0053768;
U.S. Patent Application Publication No. 2015/0053769;
U.S. Patent Application Publication No. 2015/0060544;
U.S. Patent Application Publication No. 2015/0062366;
U.S. Patent Application Publication No. 2015/0063215;
U.S. Patent Application Publication No. 2015/0063676;
U.S. Patent Application Publication No. 2015/0069130;
U.S. Patent Application Publication No. 2015/0071819;
U.S. Patent Application Publication No. 2015/0083800;
U.S. Patent Application Publication No. 2015/0086114;
U.S. Patent Application Publication No. 2015/0088522;
U.S. Patent Application Publication No. 2015/0096872;
U.S. Patent Application Publication No. 2015/0099557;
U.S. Patent Application Publication No. 2015/0100196;
U.S. Patent Application Publication No. 2015/0102109;
U.S. Patent Application Publication No. 2015/0115035;
U.S. Patent Application Publication No. 2015/0127791;
U.S. Patent Application Publication No. 2015/0128116;
U.S. Patent Application Publication No. 2015/0129659;
U.S. Patent Application Publication No. 2015/0133047;
U.S. Patent Application Publication No. 2015/0134470;
U.S. Patent Application Publication No. 2015/0136851;
U.S. Patent Application Publication No. 2015/0136854;
U.S. Patent Application Publication No. 2015/0142492;
U.S. Patent Application Publication No. 2015/0144692;
U.S. Patent Application Publication No. 2015/0144698;
U.S. Patent Application Publication No. 2015/0144701;
U.S. Patent Application Publication No. 2015/0149946;
U.S. Patent Application Publication No. 2015/0161429;
U.S. Patent Application Publication No. 2015/0169925;
U.S. Patent Application Publication No. 2015/0169929;
U.S. Patent Application Publication No. 2015/0178523;
U.S. Patent Application Publication No. 2015/0178534;
U.S. Patent Application Publication No. 2015/0178535;
U.S. Patent Application Publication No. 2015/0178536;
U.S. Patent Application Publication No. 2015/0178537;
U.S. Patent Application Publication No. 2015/0181093;
U.S. Patent Application Publication No. 2015/0181109;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/458,405 for an Electronic Device, filed Jun. 19, 2013 (Fitch et al.);
U.S. patent application Ser. No. 29/459,620 for an Electronic Device Enclosure, filed Jul. 2, 2013 (London et al.);
U.S. patent application Ser. No. 29/468,118 for an Electronic Device Case, filed Sep. 26, 2013 (Oberpriller et al.);
U.S. patent application Ser. No. 14/150,393 for Indicia-reader Having Unitary Construction Scanner, filed Jan. 8, 2014 (Colavito et al.);
U.S. patent application Ser. No. 14/200,405 for Indicia Reader for Size-Limited Applications filed Mar. 7, 2014 (Feng et al.);
U.S. patent application Ser. No. 14/231,898 for Hand-Mounted Indicia-Reading Device with Finger Motion Triggering filed Apr. 1, 2014 (Van Horn et al.);
U.S. patent application Ser. No. 29/486,759 for an Imaging Terminal, filed Apr. 2, 2014 (Oberpriller et al.);
U.S. patent application Ser. No. 14/257,364 for Docking System and Method Using Near Field Communication filed Apr. 21, 2014 (Showering);
U.S. patent application Ser. No. 14/264,173 for Autofocus Lens System for Indicia Readers filed Apr. 29, 2014 (Ackley et al.);
U.S. patent application Ser. No. 14/277,337 for MULTIPURPOSE OPTICAL READER, filed May 14, 2014 (Jovanovski et al.);
U.S. patent application Ser. No. 14/283,282 for TERMINAL HAVING ILLUMINATION AND FOCUS CONTROL filed May 21, 2014 (Liu et al.);
U.S. patent application Ser. No. 14/327,827 for a MOBILE-PHONE ADAPTER FOR ELECTRONIC TRANSACTIONS, filed Jul. 10, 2014 (Hejl);
U.S. patent application Ser. No. 14/334,934 for a SYSTEM AND METHOD FOR INDICIA VERIFICATION, filed Jul. 18, 2014 (Hejl);
U.S. patent application Ser. No. 14/339,708 for LASER SCANNING CODE SYMBOL READING SYSTEM, filed Jul. 24, 2014 (Xian et al.);
U.S. patent application Ser. No. 14/340,627 for an AXIALLY REINFORCED FLEXIBLE SCAN ELEMENT, filed Jul. 25, 2014 (Rueblinger et al.);
U.S. patent application Ser. No. 14/446,391 for MULTIFUNCTION POINT OF SALE APPARATUS WITH OPTICAL SIGNATURE CAPTURE filed Jul. 30, 2014 (Good et al.);
U.S. patent application Ser. No. 14/452,697 for INTERACTIVE INDICIA READER, filed Aug. 6, 2014 (Todeschini);
U.S. patent application Ser. No. 14/453,019 for DIMENSIONING SYSTEM WITH GUIDED ALIGNMENT, filed Aug. 6, 2014 (Li et al.);
U.S. patent application Ser. No. 14/462,801 for MOBILE COMPUTING DEVICE WITH DATA COGNITION SOFTWARE, filed on Aug. 19, 2014 (Todeschini et al.);
U.S. patent application Ser. No. 14/483,056 for VARIABLE DEPTH OF FIELD BARCODE SCANNER filed Sep. 10, 2014 (McCloskey et al.);
U.S. patent application Ser. No. 14/513,808 for IDENTIFYING INVENTORY ITEMS IN A STORAGE FACILITY filed Oct. 14, 2014 (Singel et al.);
U.S. patent application Ser. No. 14/519,195 for HAND-HELD DIMENSIONING SYSTEM WITH FEEDBACK filed Oct. 21, 2014 (Laffargue et al.);
U.S. patent application Ser. No. 14/519,179 for DIMENSIONING SYSTEM WITH MULTIPATH INTERFERENCE MITIGATION filed Oct. 21, 2014 (Thuries et al.);
U.S. patent application Ser. No. 14/519,211 for SYSTEM AND METHOD FOR DIMENSIONING filed Oct. 21, 2014 (Ackley et al.);
U.S. patent application Ser. No. 14/519,233 for HAND-HELD DIMENSIONER WITH DATA-QUALITY INDICATION filed Oct. 21, 2014 (Laffargue et al.);

U.S. patent application Ser. No. 14/519,249 for HANDHELD DIMENSIONING SYSTEM WITH MEASUREMENT-CONFORMANCE FEEDBACK filed Oct. 21, 2014 (Ackley et al.);

U.S. patent application Ser. No. 14/527,191 for METHOD AND SYSTEM FOR RECOGNIZING SPEECH USING WILDCARDS IN AN EXPECTED RESPONSE filed Oct. 29, 2014 (Braho et al.);

U.S. patent application Ser. No. 14/529,563 for ADAPTABLE INTERFACE FOR A MOBILE COMPUTING DEVICE filed Oct. 31, 2014 (Schoon et al.);

U.S. patent application Ser. No. 14/529,857 for BARCODE READER WITH SECURITY FEATURES filed Oct. 31, 2014 (Todeschini et al.);

U.S. patent application Ser. No. 14/398,542 for PORTABLE ELECTRONIC DEVICES HAVING A SEPARATE LOCATION TRIGGER UNIT FOR USE IN CONTROLLING AN APPLICATION UNIT filed Nov. 3, 2014 (Bian et al.);

U.S. patent application Ser. No. 14/531,154 for DIRECTING AN INSPECTOR THROUGH AN INSPECTION filed Nov. 3, 2014 (Miller et al.);

U.S. patent application Ser. No. 14/533,319 for BARCODE SCANNING SYSTEM USING WEARABLE DEVICE WITH EMBEDDED CAMERA filed Nov. 5, 2014 (Todeschini);

U.S. patent application Ser. No. 14/535,764 for CONCATENATED EXPECTED RESPONSES FOR SPEECH RECOGNITION filed Nov. 7, 2014 (Braho et al.);

U.S. patent application Ser. No. 14/568,305 for AUTO-CONTRAST VIEWFINDER FOR AN INDICIA READER filed Dec. 12, 2014 (Todeschini);

U.S. patent application Ser. No. 14/573,022 for DYNAMIC DIAGNOSTIC INDICATOR GENERATION filed Dec. 17, 2014 (Goldsmith);

U.S. patent application Ser. No. 14/578,627 for SAFETY SYSTEM AND METHOD filed Dec. 22, 2014 (Ackley et al.);

U.S. patent application Ser. No. 14/580,262 for MEDIA GATE FOR THERMAL TRANSFER PRINTERS filed Dec. 23, 2014 (Bowles);

U.S. patent application Ser. No. 14/590,024 for SHELVING AND PACKAGE LOCATING SYSTEMS FOR DELIVERY VEHICLES filed Jan. 6, 2015 (Payne);

U.S. patent application Ser. No. 14/596,757 for SYSTEM AND METHOD FOR DETECTING BARCODE PRINTING ERRORS filed Jan. 14, 2015 (Ackley);

U.S. patent application Ser. No. 14/416,147 for OPTICAL READING APPARATUS HAVING VARIABLE SETTINGS filed Jan. 21, 2015 (Chen et al.);

U.S. patent application Ser. No. 14/614,706 for DEVICE FOR SUPPORTING AN ELECTRONIC TOOL ON A USER'S HAND filed Feb. 5, 2015 (Oberpriller et al.);

U.S. patent application Ser. No. 14/614,796 for CARGO APPORTIONMENT TECHNIQUES filed Feb. 5, 2015 (Morton et al.);

U.S. patent application Ser. No. 29/516,892 for TABLE COMPUTER filed Feb. 6, 2015 (Bidwell et al.);

U.S. patent application Ser. No. 14/619,093 for METHODS FOR TRAINING A SPEECH RECOGNITION SYSTEM filed Feb. 11, 2015 (Pecorari);

U.S. patent application Ser. No. 14/628,708 for DEVICE, SYSTEM, AND METHOD FOR DETERMINING THE STATUS OF CHECKOUT LANES filed Feb. 23, 2015 (Todeschini);

U.S. patent application Ser. No. 14/630,841 for TERMINAL INCLUDING IMAGING ASSEMBLY filed Feb. 25, 2015 (Gomez et al.);

U.S. patent application Ser. No. 14/635,346 for SYSTEM AND METHOD FOR RELIABLE STORE-AND-FORWARD DATA HANDLING BY ENCODED INFORMATION READING TERMINALS filed Mar. 2, 2015 (Sevier);

U.S. patent application Ser. No. 29/519,017 for SCANNER filed Mar. 2, 2015 (Zhou et al.);

U.S. patent application Ser. No. 14/405,278 for DESIGN PATTERN FOR SECURE STORE filed Mar. 9, 2015 (Zhu et al.);

U.S. patent application Ser. No. 14/660,970 for DECODABLE INDICIA READING TERMINAL WITH COMBINED ILLUMINATION filed Mar. 18, 2015 (Kearney et al.);

U.S. patent application Ser. No. 14/661,013 for REPROGRAMMING SYSTEM AND METHOD FOR DEVICES INCLUDING PROGRAMMING SYMBOL filed Mar. 18, 2015 (Soule et al.);

U.S. patent application Ser. No. 14/662,922 for MULTIFUNCTION POINT OF SALE SYSTEM filed Mar. 19, 2015 (Van Horn et al.);

U.S. patent application Ser. No. 14/663,638 for VEHICLE MOUNT COMPUTER WITH CONFIGURABLE IGNITION SWITCH BEHAVIOR filed Mar. 20, 2015 (Davis et al.);

U.S. patent application Ser. No. 14/664,063 for METHOD AND APPLICATION FOR SCANNING A BARCODE WITH A SMART DEVICE WHILE CONTINUOUSLY RUNNING AND DISPLAYING AN APPLICATION ON THE SMART DEVICE DISPLAY filed Mar. 20, 2015 (Todeschini);

U.S. patent application Ser. No. 14/669,280 for TRANSFORMING COMPONENTS OF A WEB PAGE TO VOICE PROMPTS filed Mar. 26, 2015 (Funyak et al.);

U.S. patent application Ser. No. 14/674,329 for AIMER FOR BARCODE SCANNING filed Mar. 31, 2015 (Bidwell);

U.S. patent application Ser. No. 14/676,109 for INDICIA READER filed Apr. 1, 2015 (Huck);

U.S. patent application Ser. No. 14/676,327 for DEVICE MANAGEMENT PROXY FOR SECURE DEVICES filed Apr. 1, 2015 (Yeakley et al.);

U.S. patent application Ser. No. 14/676,898 for NAVIGATION SYSTEM CONFIGURED TO INTEGRATE MOTION SENSING DEVICE INPUTS filed Apr. 2, 2015 (Showering);

U.S. patent application Ser. No. 14/679,275 for DIMENSIONING SYSTEM CALIBRATION SYSTEMS AND METHODS filed Apr. 6, 2015 (Laffargue et al.);

U.S. patent application Ser. No. 29/523,098 for HANDLE FOR A TABLET COMPUTER filed Apr. 7, 2015 (Bidwell et al.);

U.S. patent application Ser. No. 14/682,615 for SYSTEM AND METHOD FOR POWER MANAGEMENT OF MOBILE DEVICES filed Apr. 9, 2015 (Murawski et al.);

U.S. patent application Ser. No. 14/686,822 for MULTIPLE PLATFORM SUPPORT SYSTEM AND METHOD filed Apr. 15, 2015 (Qu et al.);

U.S. patent application Ser. No. 14/687,289 for SYSTEM FOR COMMUNICATION VIA A PERIPHERAL HUB filed Apr. 15, 2015 (Kohtz et al.);

U.S. patent application Ser. No. 29/524,186 for SCANNER filed Apr. 17, 2015 (Zhou et al.);

U.S. patent application Ser. No. 14/695,364 for MEDICATION MANAGEMENT SYSTEM filed Apr. 24, 2015 (Sewell et al.);

U.S. patent application Ser. No. 14/695,923 for SECURE UNATTENDED NETWORK AUTHENTICATION filed Apr. 24, 2015 (Kubler et al.);

U.S. patent application Ser. No. 29/525,068 for TABLET COMPUTER WITH REMOVABLE SCANNING DEVICE filed Apr. 27, 2015 (Schulte et al.);

U.S. patent application Ser. No. 14/699,436 for SYMBOL READING SYSTEM HAVING PREDICTIVE DIAGNOSTICS filed Apr. 29, 2015 (Nahill et al.);

U.S. patent application Ser. No. 14/702,110 for SYSTEM AND METHOD FOR REGULATING BARCODE DATA INJECTION INTO A RUNNING APPLICATION ON A SMART DEVICE filed May 1, 2015 (Todeschini et al.);

U.S. patent application Ser. No. 14/702,979 for TRACKING BATTERY CONDITIONS filed May 4, 2015 (Young et al.);

U.S. patent application Ser. No. 14/704,050 for INTERMEDIATE LINEAR POSITIONING filed May 5, 2015 (Charpentier et al.);

U.S. patent application Ser. No. 14/705,012 for HANDS-FREE HUMAN MACHINE INTERFACE RESPONSIVE TO A DRIVER OF A VEHICLE filed May 6, 2015 (Fitch et al.);

U.S. patent application Ser. No. 14/705,407 for METHOD AND SYSTEM TO PROTECT SOFTWARE-BASED NETWORK-CONNECTED DEVICES FROM ADVANCED PERSISTENT THREAT filed May 6, 2015 (Hussey et al.);

U.S. patent application Ser. No. 14/707,037 for SYSTEM AND METHOD FOR DISPLAY OF INFORMATION USING A VEHICLE-MOUNT COMPUTER filed May 8, 2015 (Chamberlin);

U.S. patent application Ser. No. 14/707,123 for APPLICATION INDEPENDENT DEX/UCS INTERFACE filed May 8, 2015 (Pape);

U.S. patent application Ser. No. 14/707,492 for METHOD AND APPARATUS FOR READING OPTICAL INDICIA USING A PLURALITY OF DATA SOURCES filed May 8, 2015 (Smith et al.);

U.S. patent application Ser. No. 14/710,666 for PRE-PAID USAGE SYSTEM FOR ENCODED INFORMATION READING TERMINALS filed May 13, 2015 (Smith);

U.S. patent application Ser. No. 29/526,918 for CHARGING BASE filed May 14, 2015 (Fitch et al.);

U.S. patent application Ser. No. 14/715,672 for AUGUMENTED REALITY ENABLED HAZARD DISPLAY filed May 19, 2015 (Venkatesha et al.);

U.S. patent application Ser. No. 14/715,916 for EVALUATING IMAGE VALUES filed May 19, 2015 (Ackley);

U.S. patent application Ser. No. 14/722,608 for INTERACTIVE USER INTERFACE FOR CAPTURING A DOCUMENT IN AN IMAGE SIGNAL filed May 27, 2015 (Showering et al.);

U.S. patent application Ser. No. 29/528,165 for IN-COUNTER BARCODE SCANNER filed May 27, 2015 (Oberpriller et al.);

U.S. patent application Ser. No. 14/724,134 for ELECTRONIC DEVICE WITH WIRELESS PATH SELECTION CAPABILITY filed May 28, 2015 (Wang et al.);

U.S. patent application Ser. No. 14/724,849 for METHOD OF PROGRAMMING THE DEFAULT CABLE INTERFACE SOFTWARE IN AN INDICIA READING DEVICE filed May 29, 2015 (Barten);

U.S. patent application Ser. No. 14/724,908 for IMAGING APPARATUS HAVING IMAGING ASSEMBLY filed May 29, 2015 (Barber et al.);

U.S. patent application Ser. No. 14/725,352 for APPARATUS AND METHODS FOR MONITORING ONE OR MORE PORTABLE DATA TERMINALS (Caballero et al.);

U.S. patent application Ser. No. 29/528,590 for ELECTRONIC DEVICE filed May 29, 2015 (Fitch et al.);

U.S. patent application Ser. No. 29/528,890 for MOBILE COMPUTER HOUSING filed Jun. 2, 2015 (Fitch et al.);

U.S. patent application Ser. No. 14/728,397 for DEVICE MANAGEMENT USING VIRTUAL INTERFACES CROSS-REFERENCE TO RELATED APPLICATIONS filed Jun. 2, 2015 (Caballero);

U.S. patent application Ser. No. 14/732,870 for DATA COLLECTION MODULE AND SYSTEM filed Jun. 8, 2015 (Powilleit);

U.S. patent application Ser. No. 29/529,441 for INDICIA READING DEVICE filed Jun. 8, 2015 (Zhou et al.);

U.S. patent application Ser. No. 14/735,717 for INDICIA-READING SYSTEMS HAVING AN INTERFACE WITH A USER'S NERVOUS SYSTEM filed Jun. 10, 2015 (Todeschini);

U.S. patent application Ser. No. 14/738,038 for METHOD OF AND SYSTEM FOR DETECTING OBJECT WEIGHING INTERFERENCES filed Jun. 12, 2015 (Amundsen et al.);

U.S. patent application Ser. No. 14/740,320 for TACTILE SWITCH FOR A MOBILE ELECTRONIC DEVICE filed Jun. 16, 2015 (Bandringa);

U.S. patent application Ser. No. 14/740,373 for CALIBRATING A VOLUME DIMENSIONER filed Jun. 16, 2015 (Ackley et al.);

U.S. patent application Ser. No. 14/742,818 for INDICIA READING SYSTEM EMPLOYING DIGITAL GAIN CONTROL filed Jun. 18, 2015 (Xian et al.);

U.S. patent application Ser. No. 14/743,257 for WIRELESS MESH POINT PORTABLE DATA TERMINAL filed Jun. 18, 2015 (Wang et al.);

U.S. patent application Ser. No. 29/530,600 for CYCLONE filed Jun. 18, 2015 (Vargo et al);

U.S. patent application Ser. No. 14/744,633 for IMAGING APPARATUS COMPRISING IMAGE SENSOR ARRAY HAVING SHARED GLOBAL SHUTTER CIRCUITRY filed Jun. 19, 2015 (Wang);

U.S. patent application Ser. No. 14/744,836 for CLOUD-BASED SYSTEM FOR READING OF DECODABLE INDICIA filed Jun. 19, 2015 (Todeschini et al.);

U.S. patent application Ser. No. 14/745,006 for SELECTIVE OUTPUT OF DECODED MESSAGE DATA filed Jun. 19, 2015 (Todeschini et al.);

U.S. patent application Ser. No. 14/747,197 for OPTICAL PATTERN PROJECTOR filed Jun. 23, 2015 (Thuries et al.);

U.S. patent application Ser. No. 14/747,490 for DUAL-PROJECTOR THREE-DIMENSIONAL SCANNER filed Jun. 23, 2015 (Jovanovski et al.); and U.S. patent application Ser. No. 14/748,446 for CORDLESS INDICIA READER WITH A MULTIFUNCTION COIL FOR WIRELESS CHARGING AND EAS DEACTIVATION, filed Jun. 24, 2015 (Xie et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A barcode scanning device comprising:
a light source configured to emit a beam of light;
a first sensor configured to detect a first optical signal indicative of light reflecting off of a barcode, the reflected light originating from the light source and from at least one ambient light source in the vicinity of the barcode scanning device;
a second sensor configured to detect a second optical signal indicative of light originating from the at least one ambient light source;
a noise cancelling circuit configured to obtain a noise-cancelled scanning signal from the first and second optical signals; and
a mirror having an aperture in the center of the mirror, wherein the first sensor is configured to sense light illuminating through the aperture and the second sensor is configured to sense light reflected off of the mirror.

2. The barcode scanning device of claim 1, wherein the noise cancelling circuit comprises a differential amplifier configured to subtract the second optical signal from the first optical signal to obtain the noise-cancelled scanning signal.

3. The barcode scanning device of claim 1, wherein the first and second sensors include photodiodes for sensing light.

4. The barcode scanning device of claim 1, wherein the first sensor includes a first field of view that encompasses at least a spot where the beam of light is directed on the barcode.

5. The barcode scanning device of claim 4, wherein the second sensor includes a second field of view that encompasses an area proximate to the first field of view.

6. The barcode scanning device of claim 4, wherein the second sensor includes multiple sensors having a second field of view that encompasses a first area on one side of the first field of view and a third field of view that encompasses a second area on an opposite side of the first field of view.

7. The barcode scanning device of claim 4, wherein the second sensor includes a second field of view that encompasses an area that surrounds the first field of view.

8. The barcode scanning device of claim 1, wherein the aperture is configured to allow substantially all of the reflected light originating from the light source to pass through the aperture in the center of the mirror to the first sensor rather than reflecting off the mirror to the second sensor.

9. The barcode scanning device of claim 7, further comprising a spectral beam splitter configured to reflect light originating from the at least one ambient light source and further configured to pass light originating from the light source and from the at least one ambient light source, wherein the first sensor is configured to sense the light that passes through the spectral beam splitter and the second sensor is configured to sense the light reflected off of the spectral beam splitter.

10. The barcode scanning device of claim 1, further comprising a laser filter lens configured to pass laser frequency light and direct the laser frequency light onto the first sensor.

11. A laser scanning apparatus comprising:
a housing;
a laser source configured to emit a beam of laser light to be scanned across a barcode;
a first photodiode disposed in the housing, the first photodiode configured to detect a first optical signal indicative of reflected light originating from the beam of laser light and ambient light originating from at least one ambient light source;
a noise cancelling circuit configured to provide at an output thereof a noise-cancelled scanning signal derived from the first optical signal and a second optical signal indicative of the ambient light originating from the at least one ambient light source; and
a mirror having an aperture in the center of the mirror, wherein the first photodiode is configured to detect light illuminating through the aperture.

12. The laser scanning apparatus of claim 11, wherein the noise cancelling circuit comprises a differential amplifier configured to subtract the second optical signal from the first optical signal to obtain the noise-cancelled scanning signal.

13. The laser scanning apparatus of claim 11, further comprising a second photodiode disposed outside the housing in the vicinity of the first photodiode, the second photodiode configured to sense a second optical signal comprising light reflected off of the mirror, wherein the first photodiode includes a first field of view that encompasses at least a spot where the beam of laser light is directed onto the barcode, and wherein the second photodiode includes a second field of view that encompasses at least an area adjacent to the first field of view.

14. A noise cancellation circuit comprising:
at least one optical sensor configured to detect a first optical signal in a first stage and detect a second optical signal in a second stage;
a differential amplifier configured to subtract the second optical signal from the first optical signal to thereby remove a noise component from the first optical signal;
a notch filter; and
a frequency matching circuit;
wherein the first optical signal includes a laser scanning component and the noise component, the noise component corresponding to ambient light from at least one ambient light source;
wherein the second optical signal includes the noise component; and
wherein the differential amplifier is configured to output a noise-cancelled scanning signal.

15. The noise cancellation circuit of claim 14, wherein the at least one optical sensor includes a first optical sensor and a second optical sensor, the first optical sensor having a first field of view that encompasses at least a spot where a beam of light is directed, and the second optical sensor having a second field of view that encompasses an area adjacent to the first field of view.

16. The noise cancellation circuit of claim 14, wherein the at least one optical sensor includes a single optical sensor.

17. The noise cancellation circuit of claim 16, further comprising a transistor configured, in response to a modulating input signal, to switch a visible laser diode on and off, wherein the single optical sensor is configured to detect the first optical signal in the first stage and detect the second optical signal in the second stage, and wherein the first optical signal includes the laser scanning component from the visible laser diode.

18. The noise cancellation circuit of claim 16, further comprising a phase shift circuit and a delay line, the phase shift circuit configured to receive the first optical signal, and the delay line configured to receive the second optical signal.

19. The noise cancellation circuit of claim 16, further comprising a first sample and hold circuit and a second sample and hold circuit, the first sample and hold circuit configured to receive the first optical signal, and the second sample and hold circuit configured to receive the second optical signal.

20. The noise cancellation circuit of claim 16, further comprising an active filter circuit for filtering the noise component with the notch filter.

\* \* \* \* \*